US010778326B1

United States Patent
Mukhopadhyay et al.

(10) Patent No.: US 10,778,326 B1
(45) Date of Patent: Sep. 15, 2020

(54) MANAGEMENT AND CONTROL PLANE REDUNDANCY IN A DISAGGREGATED NETWORK ELEMENT

(71) Applicant: Fujitsu Limited, Kawasaki-shi, Kanagawa (JP)

(72) Inventors: Maitreya Mukhopadhyay, Allen, TX (US); David W. Terwilliger, Garland, TX (US); Edwin Jay Burger, Flower Mound, TX (US); Sridevi Palacharla, Richardson, TX (US); Qiang Li, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/569,834

(22) Filed: Sep. 13, 2019

(51) Int. Cl.
*H04B 10/032* (2013.01)
*H04J 14/02* (2006.01)
*H04L 1/00* (2006.01)
*H04B 10/61* (2013.01)
*H04B 10/27* (2013.01)

(52) U.S. Cl.
CPC ........... *H04B 10/032* (2013.01); *H04B 10/27* (2013.01); *H04B 10/61* (2013.01); *H04J 14/0212* (2013.01); *H04J 14/0287* (2013.01); *H04L 1/0041* (2013.01); *H04L 1/0061* (2013.01)

(58) Field of Classification Search
CPC ............................ H04B 10/032; H04J 14/0287
See application file for complete search history.

(56) References Cited

U.S. PATENT DOCUMENTS

| 5,533,188 | A | * | 7/1996 | Palumbo | G06F 11/1679 714/10 |
| 2004/0208175 | A1 | * | 10/2004 | McCabe | H04L 45/04 370/389 |
| 2005/0232629 | A1 | * | 10/2005 | Amemiya | H04Q 11/0005 398/45 |
| 2008/0140730 | A1 | * | 6/2008 | Toshine | G06F 16/185 |
| 2009/0060496 | A1 | * | 3/2009 | Liu | H04J 3/1694 398/17 |
| 2017/0041181 | A1 | * | 2/2017 | Achuthan | G06F 9/542 |
| 2018/0152541 | A1 | * | 5/2018 | Mathison | H04L 67/02 |

* cited by examiner

*Primary Examiner* — Nathan M Cors
(74) *Attorney, Agent, or Firm* — Baker Botts L.L.P.

(57) ABSTRACT

A disaggregated network element of an optical transport network, addressable at a single IP address, includes an active management and control unit (MCU) communicatively coupled to a standby MCU by physical cables and multiple tributary units, each of which performs a function in a data plane that carries user traffic and is communicatively coupled to both MCUs by respective physical cables. The MCUs host respective copies of configuration information for the network element and synchronize the information between them. In response to a loss of communication between the MCUs, a tributary unit designated as a witness tributary unit is consulted to determine the status of the MCUs, after which actions are taken to provide control plane redundancy. In response to a failure of an MCU, a backup copy of the configuration information is stored on the witness tributary unit and subsequently synchronized with a copy stored on the remaining MCU.

20 Claims, 11 Drawing Sheets

MANAGEMENT AND CONTROL PLANE REDUNDANCY IN A DISAGGREGATED NETWORK ELEMENT

BACKGROUND

Field of the Disclosure

The present disclosure relates generally to optical communication networks and, more particularly, to management and control plane redundancy in a disaggregated network element.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Traditionally, telecommunications equipment vendors have built chassis-based network elements in which multiple functional cards are physically aggregated within a single housing and are connected to each other via a backplane. In these network elements, failure detection and switchover mechanisms often depend on the properties and capabilities of the backplane into which the cards are slotted. The availability of the backplane may provide equipment protection of one or more management and control units (MCUs) in the chassis-based network element.

Some telecommunications equipment vendors have begun building disaggregated network elements in which there is no backplane. These network elements may include multiple MCUs and user-traffic-carrying tributary units that are logically aggregated and are interconnected by physical cables. These network elements may not be able to provide equipment protection of their MCUs that is as robust as that provided by a chassis-based network element. Protocols such as the Virtual Router Redundancy Protocol may allow multiple MCU masters at the same time, which can lead to a split-brain scenario in which management communication between a network management system and a network element or user traffic between multiple network elements is error prone. One approach to minimizing the impact of a split-brain scenario is to use a different Internet Protocol (IP) address to address each master MCU individually in the control plane.

SUMMARY

In one aspect, a disclosed disaggregated network element includes a first management and control unit (MCU) designated as an active MCU for a management and control plane of an optical transport network and configured to host a primary copy of configuration information for the disaggregated network element, a second MCU communicatively coupled to the first MCU over one or more physical cables, the second MCU designated as a standby MCU for the management and control plane of the optical transport network and configured to host a secondary copy of the configuration information for the disaggregated network element, and multiple tributary units. Each of the tributary units is configured to perform a respective function in a data plane over which user traffic is carried in the optical transport network and is communicatively coupled to the first MCU and the second MCU over respective physical cables. A given one of the multiple tributary units is designated as a witness tributary unit. The first MCU is configured to receive configuration transactions via a management network of the management and control plane of the optical transport network, each configuration transaction representing a change to a provisioned resource of the disaggregated network element, and for each received configuration transaction, to send a first management and control message to a tributary unit targeted by the configuration transaction to effect the change, to store an indication of the configuration transaction in the primary copy of configuration information, to send a second management and control message including an indication of the configuration transaction to the second MCU to synchronize the secondary copy of the configuration information with the primary copy of the configuration information and, responsive to detecting a loss of communication between the first MCU and the second MCU, to request, from the given tributary unit designated as the witness tributary unit, an indication of health of the second MCU, and to take corrective action to provide management and control plane redundancy in the disaggregated network element dependent on an indication of the health of the second MCU received from the given tributary unit.

In any of the disclosed embodiments, configuration transactions directed to the disaggregated network element may be received via the management network of the management and control plane of the optical transport network at a single Internet Protocol (IP) address for the disaggregated network element irrespective of whether the first MCU or the second MCU is designated as the active MCU for the management and control plane.

In any of the disclosed embodiments, each of the tributary units may be a standalone component of the disaggregated network element including a respective housing and a respective power supply.

In any of the disclosed embodiments, the first MCU may include a link manager configured to exchange management and control messages with the second MCU, the second MCU may include a link manager configured to exchange management and control messages with the first MCU, and each of the tributary units may include a respective link manager configured to exchange management messages with the respective link managers of the first MCU and the second MCU.

In any of the disclosed embodiments, for each of the tributary units, the tributary unit may be communicatively coupled to a port on the first MCU having a same port identifier as a port identifier of a port on the second MCU to which the tributary unit is communicatively coupled.

In any of the disclosed embodiments, responsive to detecting a loss of communication between the first MCU and the second MCU and a loss of communication between the first MCU and the given tributary unit designated as the witness tributary unit, the first MCU may be configured to demote itself from a designation as the active MCU for the management and control plane to a designation as a standby MCU for the management and control plane.

In any of the disclosed embodiments, to take corrective action responsive to receiving an indication from the given tributary unit designated as the witness tributary unit of a failure of the second MCU, the first MCU may be configured to provide a backup copy of the configuration information for the disaggregated network element to the given tributary unit and, subsequent to providing the backup copy to the given tributary unit, to receive additional configuration transactions via the management network, each additional configuration transaction representing a change to a provisioned resource of the disaggregated network element and, for each additional configuration transaction received subsequent to providing the backup copy to the given tributary unit, to send a first management and control message to a tributary unit targeted by the configuration transaction to effect the change, to store an indication of the configuration transaction in the primary copy of configuration information, and to send a second management and control message including an indication of the configuration transaction to the given tributary unit to synchronize the backup copy of the configuration information with the primary copy of the configuration information.

In any of the disclosed embodiments, the disaggregated network element may further include a third MCU communicatively coupled to the first MCU and the second MCU over respective physical cables, the third MCU being designated as a standby MCU for the management and control plane of the optical transport network and configured to host a tertiary copy of the configuration information for the disaggregated network element. For each received configuration transaction, the first MCU may be further configured to send a third management and control message including an indication of the configuration transaction to the third MCU to synchronize the tertiary copy of the configuration information with the primary copy of the configuration information.

In any of the disclosed embodiments, a tributary unit other than the given tributary unit may be designated as an additional witness tributary unit, and selection of the given tributary unit rather than the other tributary unit as the tributary unit from which an indication of the health of the second MCU is requested by the first MCU may be configurable.

In another aspect, a disclosed method for providing management and control plane redundancy in a disaggregated network element includes beginning to receive, at a first management and control unit (MCU) of the disaggregated network element designated as an active MCU for a management and control plane of an optical transport network, configuration transactions via a management network of the management and control plane of the optical transport network, each configuration transaction representing a change to a provisioned resource of the disaggregated network element, for each received configuration transaction, sending, by the first MCU, a first management message to a tributary unit of the disaggregated network element targeted by the configuration transaction to effect the change, the tributary unit targeted by the configuration transaction being one of multiple tributary units, each of which is configured to perform a respective function in a data plane over which user traffic is carried in the optical transport network and each of which is communicatively coupled, over respective physical cables, to the first MCU and to a second MCU communicatively coupled to the first MCU over one or more physical cables, the second MCU designated as a standby MCU for the management and control plane of the optical transport network, storing, by the first MCU, an indication of the configuration transaction in a primary copy of configuration information for the disaggregated network element hosted by the first MCU, and sending, by the first MCU, a second management message including an indication of the configuration transaction to the second MCU to synchronize a secondary copy of the configuration information hosted by the second MCU with the primary copy of the configuration information. The method also includes detecting a loss of communication between the first MCU and the second MCU and, responsive to detecting the loss of communication between the first MCU and the second MCU, requesting, from a given one of the multiple tributary units designated as a witness tributary unit, an indication of health of the second MCU, and taking corrective action to provide management and control plane redundancy for the disaggregated network element dependent on an indication of the health of the second MCU received from the given tributary unit.

In any of the disclosed embodiments, the method may further include, prior to beginning to receive configuration transactions at the first MCU, the first MCU assuming an initial designation as a standby MCU for the management and control plane upon startup, the first MCU determining that the disaggregated network element does not already include an MCU designated as the active MCU for the management and control plane, the first MCU determining that the second MCU is designated as a standby MCU and, dependent on predefined active MCU selection criteria, the first MCU promoting itself from a designation as a standby MCU to a designation as the active MCU for the management and control plane.

In any of the disclosed embodiments, the method may further include, during initial deployment of a first one of the multiple tributary units, communicatively coupling the first tributary unit to a port on the first MCU having a same port identifier as a port identifier of a port on the second MCU to which the tributary unit is communicatively coupled, subsequent to the initial deployment of the first tributary unit, determining that the first tributary unit is no longer communicatively coupled to respective ports on the first MCU and on the second MCU having the same port number, and raising a mis-cable alert indicating that the first tributary unit is no longer able to communicate with the first MCU and the second MCU in the management and control plane.

In any of the disclosed embodiments, the method may further include the first MCU detecting that it has lost communication with the second MCU and with the given tributary unit designated as the witness tributary unit, and the first MCU demoting itself from a designation as the active MCU for the management and control plane to a designation as a standby MCU for the management and control plane.

In any of the disclosed embodiments, the method may further include the second MCU detecting that it has lost communication with the first MCU, that it remains in communication with the given tributary unit designated as the witness tributary unit, and that the given tributary unit is no longer in communication with the first MCU, and the second MCU promoting itself from a designation as a standby MCU for the management and control plane to a designation as the active MCU for the management and control plane.

In any of the disclosed embodiments, responsive to receiving an indication from the given tributary unit designated as the witness tributary unit of a failure of the second MCU, taking corrective action to provide management and control plane redundancy for the disaggregated network element may include providing, by the first MCU a backup copy of the configuration information for the disaggregated network element to the given tributary unit. The method may further include, subsequent to providing the backup copy to the given tributary unit, receiving, by the first MCU, additional configuration transactions via the management network, each additional configuration transaction representing a change to a provisioned resource of the disaggregated network element and, for each additional configuration transaction received subsequent to providing the backup copy to the given tributary unit, sending, by the first MCU, a first management and control message to a tributary unit targeted by the configuration transaction to effect the change, storing, by the first MCU, an indication of the configuration transaction in the primary copy of configuration information, and sending, by the first MCU, a second management and control message including an indication of the configuration transaction to the given tributary unit to synchronize the backup copy of the configuration information with the primary copy of the configuration information.

In any of the disclosed embodiments, the method may further include, for each received configuration transaction, incrementing, by the first MCU, a first transaction identifier maintained by the first MCU, and incrementing, by the second MCU, a second transaction identifier maintained by the second MCU. The method may also include, for each additional received configuration transaction, incrementing, by the first MCU, the first transaction identifier maintained by the first MCU, and incrementing, by the given tributary unit designated as the witness tributary unit, a third transaction identifier maintained by the given tributary unit.

In any of the disclosed embodiments, the method may further include determining that an MCU other than the first MCU is a newly active MCU for the management and control plane, determining that a transaction identifier maintained by the newly active MCU has a lower value than a transaction identifier maintained by another MCU in the disaggregated network element or by the given tributary unit designated as the witness tributary unit, and obtaining, by the newly active MCU, configuration information stored by the other MCU or the given tributary unit having a highest transaction identifier value.

In yet another aspect, a disclosed optical transport network includes multiple disaggregated network elements communicatively coupled to a management network, each including a first management and control unit (MCU) designated as an active MCU for a management and control plane of an optical transport network and configured to host a primary copy of configuration information for the disaggregated network element, a second MCU communicatively coupled to the first MCU over one or more physical cables, the second MCU designated as a standby MCU for the management and control plane of the optical transport network and configured to host a secondary copy of the configuration information for the disaggregated network element, and multiple tributary units. Each of the tributary units is configured to perform a respective function in a data plane over which user traffic is carried in the optical transport network and is communicatively coupled to the first MCU and the second MCU over respective physical cables, wherein a given one of the tributary units is designated as a witness tributary unit. The first MCU is configured to receive configuration transactions via a management network of the management and control plane of the optical transport network, each configuration transaction representing a change to a provisioned resource of the disaggregated network element and, for each received configuration transaction, to send a first management and control message to a tributary unit targeted by the configuration transaction to effect the change, to store an indication of the configuration transaction in the primary copy of configuration information, and to send a second management and control message including an indication of the configuration transaction to the second MCU to synchronize the secondary copy of the configuration information with the primary copy of the configuration information. Responsive to detecting a loss of communication between the first MCU and the second MCU, the first MCU is configured to request, from the given tributary unit designated as the witness tributary unit, an indication of health of the second MCU, and to take corrective action to provide management and control plane redundancy in the disaggregated network element dependent on an indication of the health of the second MCU received from the given tributary unit.

In any of the disclosed embodiments, configuration transactions directed to each of the disaggregated network elements may be received via the management network of the management and control plane of the optical transport network at a respective single Internet Protocol (IP) address for the disaggregated network element irrespective of whether the first MCU or the second MCU is designated as the active MCU for the management and control plane.

In any of the disclosed embodiments, for at least one of the multiple disaggregated network elements, to take corrective action responsive to receiving an indication from the given tributary unit designated as the witness tributary unit of a failure of the second MCU, the first MCU may be configured to provide a backup copy of the configuration information for the disaggregated network element to the given tributary unit and, subsequent to providing the backup copy to the given tributary unit, to receive additional configuration transactions via the management network, each additional configuration transaction representing a change to a provisioned resource of the disaggregated network element and, for each additional configuration transaction received subsequent to providing the backup copy to the given tributary unit, to send a first management and control message to a tributary unit targeted by the configuration transaction to effect the change, to store an indication of the configuration transaction in the primary copy of configuration information, and to send a second management and control message including an indication of the configuration transaction to the given tributary unit to synchronize the backup copy of the configuration information with the primary copy of the configuration information.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As will be described in more detail below, in some embodiments, a disaggregated network element may emulate a virtual backplane among multiple management and control units (MCUs) and tributary units that will provide mechanisms to reliably detect an active MCU failure or a failure of a link to an active MCU, and to distinguish between these types of failures when taking corrective actions to provide redundancy in the management and control plane of the network element. In various embodiments, the methods and apparatus described herein may be used to provide equipment protection of MCUs in a disaggregated network element having some or all of following characteristics: a) the network element is prevented from having multiple active MCUs at any point in time, b) the network element is addressed using a single management IP address irrespective of which MCU is active, and c) the active MCU always has the latest user provisioning information and no user provisioning information can be lost as a result of protection switching.

In various embodiments, the methods and apparatus described herein may implement one or more of the following functions: a) detection of any mis-cabling between user-traffic-carrying tributary units and MCUs, b) an active MCU election approach, c) a distributed protection switching approach in which each MCU independently decides whether it should be designated as the active MCU or as a standby MCU, ensuring that no more than one MCU is active at a time, and d) a data synchronization approach that ensures that the active MCU always has the most recent information about provisioned resources and most recently loaded software images.

Figure 1:
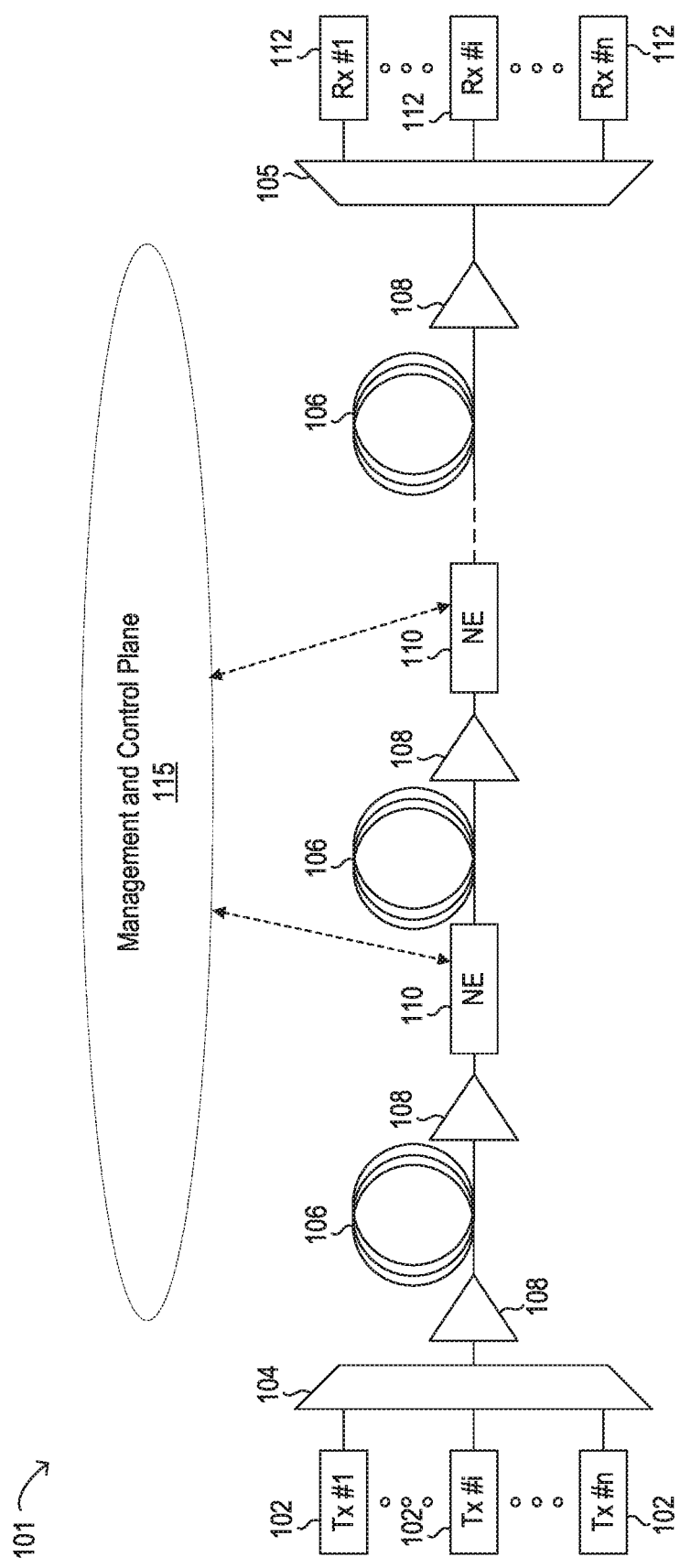
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more demultiplexers (DEMUX) 105, one or more receivers (Rx) 112, and one or more other network elements 110. In various embodiments, some or all of the network elements illustrated in FIG. 1 may be implemented as disaggregated network elements rather than chassis-based network elements. In various embodiments, a network element 110 may include an optical add/drop multiplexer (OADM), a wavelength selective switch (WSS) or another type of optical switch, an optical transmitter, an optical receiver, an optical transponder, or another functional unit in a data plane over which user traffic is carried in the optical transport network 101. In one example, an OADM may be coupled to optical transport network 101 via fibers 106 and may include a system, apparatus or device to add and drop optical signals (i.e., at individual wavelengths) from fibers 106. After passing through an OADM, an optical signal may travel along fibers 106 directly to a destination, or the signal may be passed through one or more additional OADMs and optical amplifiers before reaching a destination. In this manner, OADMs may enable connection of different optical transport network topologies together, such as different rings and different linear spans.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), Ultra-Large Effective Area Fiber (U-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber.

Optical transport network 101 may include one or more optical transmitters (Tx) 102 to transmit optical signals through optical transport network 101 in specific wavelengths or channels. In some embodiments, a network element 110 may be or include a transmitter such as transmitter 102. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102 or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal. In some embodiments, a network element 110 may be or include a multiplexer such as multiplexer 104.

Optical amplifiers 108 may amplify the multi-channeled signals within optical transport network 101. In some embodiments, a network element 110 may be or include an optical amplifier such as optical amplifier 108. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which is the portion of the optical fiber that increases the intensity of the optical signal. As an example, optical amplifiers 108 may comprise an erbium-doped fiber amplifier (EDFA). However, any other suitable amplifier, such as a semiconductor optical amplifier (SOA), may be used.

As shown in FIG. 1, optical transport network 101 may also include one or more demultiplexers 105 at one or more destinations of network 101. In some embodiments, a network element 110 may be or include a demultiplexer such as demultiplexer 105. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. In some embodiments, a network element 110 may be or include a receiver such as receiver 112. Each receiver 112 may receive optical signals transmitted at a particular wavelength or channel and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to management and control plane (or to a management plane and a separate control plane), and a data or transport plane (sometimes called the physical layer) which carries user traffic in optical transport network 101. A central management host may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the data or transport plane. The management plane may perform management functions for an overall system and provide coordination between network elements, the control plane, and the data or transport plane. As examples, the management plane may include an element management system (EMS) which handles one or more network elements from the perspective of the elements, a network management system (NMS) which handles many devices from the perspective of the network, or an operational support system (OSS) which handles network-wide operations. Optical transport network 101 illustrated in FIG. 1 includes a management and control plane 115 in communication with each of the network elements 110.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In some embodiments, transmitter 102, or an optical transponder included in a network element 110, may be or include a universally programmable transceiver for applying different modulation formats, while receiver 112, or an optical transponder included in a network element 110, may be or include the corresponding functionality for demodulation. In some embodiments, a transmitter 102 may support the use of constellation shaping and may be selectively programmed to apply constellation shaping on a per channel basis, while a receiver 112 may correspondingly demodulate channels to which a certain kind of constellation shaping has been applied. In various embodiments, a transmitter 102 and a receiver 112 may include respective mapping/de-mapping functionality, such as within a digital signal processing (DSP) module, to enable implementation of constellation shaping in optical transport network 101.

In various embodiments, any of the network elements of optical transport network 101 illustrated in FIG. 1 and described above may be configurable or programmable to provision/deprovision resources for or enable/disable particular features of the network element using configuration transaction requests, commands, or other types of management and control messages exchanged between a network management system and the applicable network elements in the management and control plane 115. In a few examples, configuration transactions directed to particular network elements may indicate a desired change that enables a currently disabled feature of a ROADM, a desired change to the modulation format or error correction code rate applied to optical traffic by an optical transponder, a desired reconfiguration of one of more switches, and the like. As described in more detail herein, each configuration transaction may be added to the configuration information for the network element, multiple copies of which may be stored in respective databases hosted on different components of the network element. In at least some embodiments, the configuration information may be stored in non-volatile memory and may be replayed, if necessary, to reapply the desired changes to the affected functional units following a loss of power or another type of interruption or failure and restore the desired configuration.

Figure 2:
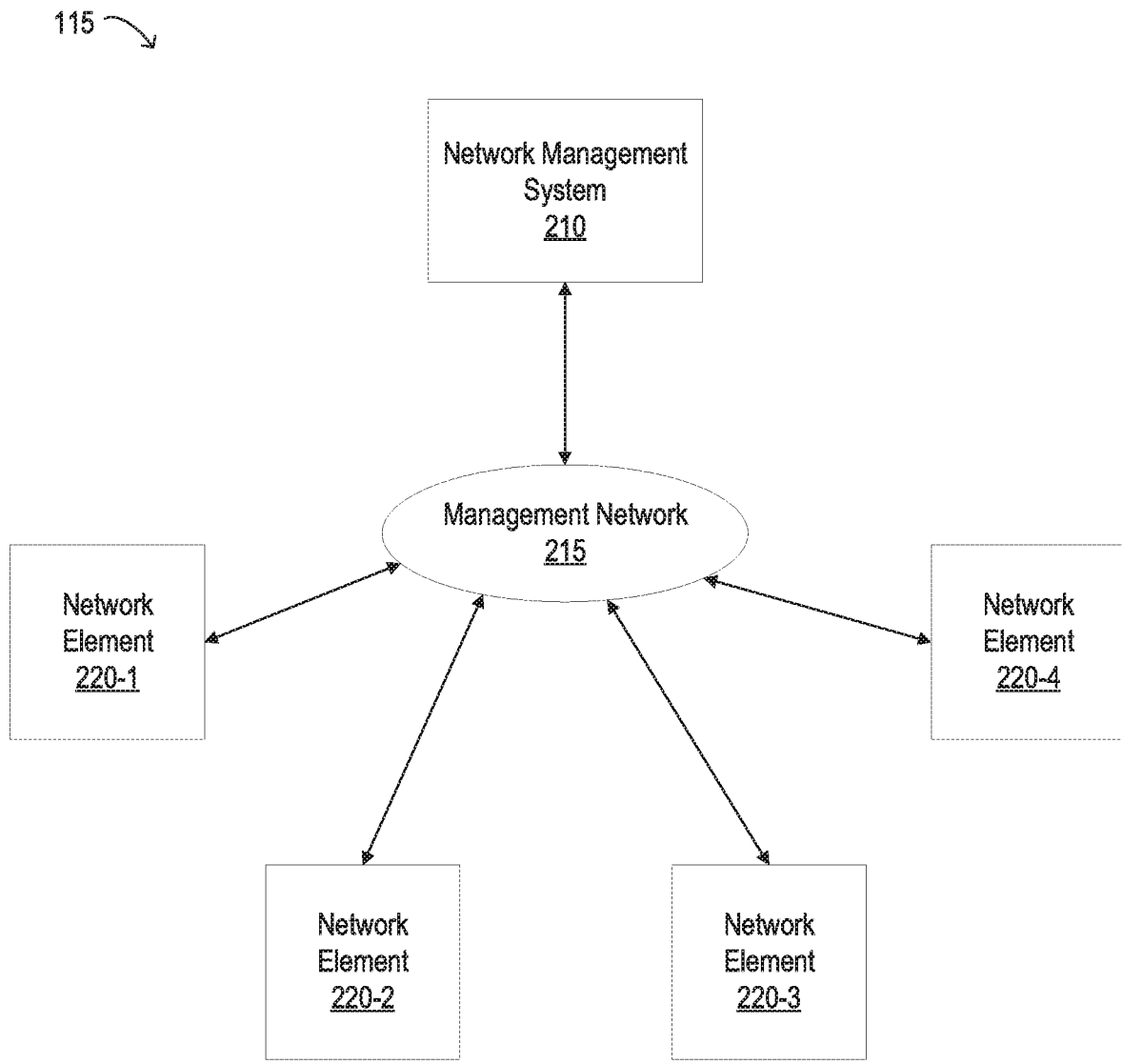
FIG. 2 is a block diagram of selected elements of a management and control plane of an optical transport network, in accordance with some embodiments.

Referring now to FIG. 2, selected elements of an embodiment of a management and control plane 115 of an optical transport network are shown. In the illustrated embodiment, management and control plane 115 includes a network management system 210 that is communicatively coupled to each of four network elements 220 through management network 214. In various embodiments, some or all of the network elements 220 illustrated in FIG. 1 may be implemented as disaggregated network elements, rather than as chassis-based network elements. Each of these disaggregated network elements may be addressed using a respective single Internet Protocol (IP) address. In this way, the fact that the network elements 220 are disaggregated network elements, rather than traditional chassis-based network elements, may be invisible to the network management system 210 and to management network 214. In addition to each of the network elements 220 being communicatively coupled to management network 215 in management and control plane 115, particular ones of the network elements 220 may be communicatively coupled to each other via separate connections in a data or transport plane of the optical transport network over which optical traffic is carried on behalf of various users (not shown in FIG. 2).

In some embodiments, management network 215 may represent a service provider network including, for example, any number of routers, switches, and other components for exchanging management and control messages with various network elements 220 in the management and control plane 115. In some embodiments, network management system 210 may represent a system through which a user, administrator, or operator of an optical transport network, such as optical transport network 101 illustrated in FIG. 1, interacts with various network elements 220 in the optical transport network to provision and configure resources and/or to enable or disable various features of those resources to implement desired functionality. For example, in at least some embodiments, configuration transactions, status requests, and/or other types of management and control messages directed to one of the disaggregated network elements 220 may be specified by a user interacting with network management system 210 and may subsequently be received at the target disaggregated network element 220 via the management network 215 of the management and control plane of the optical transport network at a respective single IP address for the target disaggregated network element As previously noted, in a traditional chassis-based network element, various cards comprising circuitry for implementing the functionality of a management and control unit (MCU) or the functionality of a user-traffic-carrying tributary unit are physically aggregated, e.g., they are housed together and are connected to each other via a backplane. In these network elements, failure detection and switchover often depend on the capabilities of the backplane. In a disaggregated network element, however, there is no such backplane available. In these network elements, multiple MCUs and a number of user-traffic-carrying tributary units are logically aggregated. For example, each MCU and functional tributary unit may be a standalone component of the disaggregated network element including its own housing and power supply. The MCUs may be interconnected with each other and with various functional tributary units by physical cables. In at least some embodiments, a disaggregated network element may emulate the capabilities of a backplane for failure detection and switchover using a collection of link managers, physical cables, and methods involving a witness tributary unit, as described herein. In at least some embodiments, the MCUs and user-traffic-carrying tributary units of a single disaggregated network element may be co-located in one physical location, such as in the same room or building. In other embodiments, the MCUs and user-traffic-carrying tributary units of a single disaggregated network element may not be co-located in the same room or building but may reside in close enough proximity to be interconnected using physical cables that provide the communication links described herein.

Figure 3:
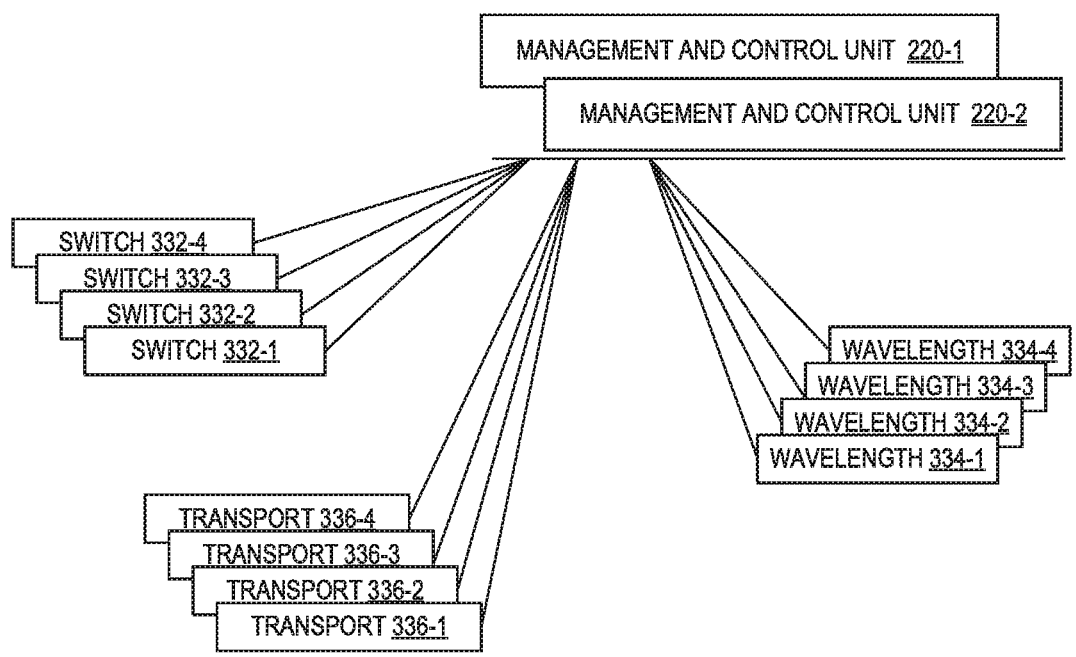
FIG. 3 is a block diagram of selected elements of an embodiment of a disaggregated network element.

FIG. 3 is a block diagram of selected elements of an embodiment of a disaggregated network element 220. In the example embodiment, network element 220 includes two management and control units 220 and twelve tributary units, each of which is configured to perform a respective function in a data plane over which user traffic is carried in the optical transport network and each of which is communicatively coupled to both of the MCUs 220 by respective physical cables. In the illustrated embodiment, these tributary units include four switch units 332, such as wavelength selective switches, for routing optical traffic in the optical transport network, four transport units 336 (e.g., optical transmitters, receivers, or transponders), and four wavelength units 334, any of which may be or include an optical add/drop multiplexer (OADM), for example. In some embodiments, a wavelength unit 334 may be or include a reconfigurable OADM (ROADM) that is capable of adding or dropping individual or multiple wavelengths of a WDM, DWDM, or superchannel signal carrying data channels to be added or dropped in the optical domain. The individual or multiple wavelengths may be added or dropped in the optical domain, for example, using a wavelength selective switch (not shown) that may be included in a ROADM. In other embodiments, a disaggregated network element may include more, fewer or different tributary units. In some embodiments, a disaggregated network element may include more than two MCUs.

Figure 4:
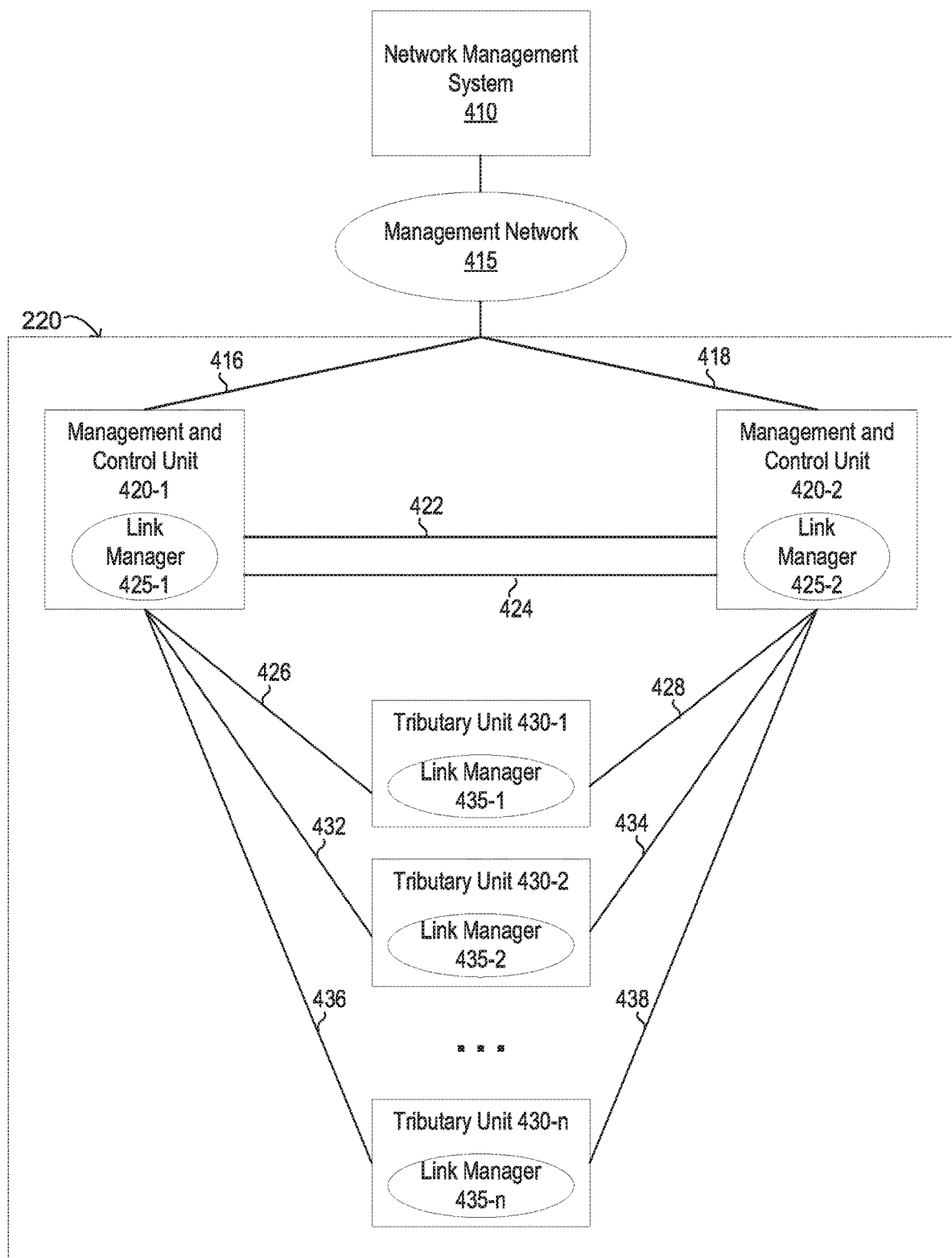
FIG. 4 is a block diagram illustrating various communication channels between selected elements of a disaggregated network element in a management and control plane, in accordance with some embodiments.

FIG. 4 is a block diagram illustrating various communication channels between selected elements of a disaggregated network element 220 in a management and control plane, in accordance with some embodiments. In the illustrated example, network element 220 includes two MCUs 420 and a number of tributary units 425 connected in a redundant fashion via physical cables. Each of the management and control units 420 includes a respective link manager 425. As shown in FIG. 4, in at least some embodiments, none of the tributary units 425 are interconnected with any other tributary units 425, resulting in a star-type topology in which each tributary unit 425 is connected only to the two MCUs 420, As described in more detail herein, at any given time, at most one of the MCUs 420 may be an active MCU and the other one of the MCUs may be a standby MCU. Network element 220 includes four other functional units shown as tributary units 430, each of which includes a link manager 435. In at least some embodiments, the link managers 425 and 435, together with the physical cables through which they are interconnected, may provide a virtual backplane for network element 220, emulating the capabilities of the backplane of a chassis-based network element by periodically exchanging MCU health information, indications of the active or standby status of each MCU 420, identifiers of various tributary units 430, and mis-cabling information and by implementing loop prevention among the MCUs 420 and tributary units 430. For example, looping is an issue that can be encountered in various existing systems in which messages are broadcast over the internet or over a layer two network. These broadcast messages do not have any particular destination, and may be continuously looped through the network, potentially causing unnecessary network outages and an excessive load on the affected communication links. In some existing ethernet systems, a Rapid Spanning Tree Protocol (RSTP) may be employed to prevent such loops. However, RSTP may not be suitable for use in the disaggregate network elements described herein due to a need to send traffic over a link that may be blocked. Therefore, in at least some embodiments, the disaggregated network elements described herein may employ a lightweight link manager type protocol that prevents looping but does not block messages used to check the health of a particular communication link and to provide that information to a redundant MCU.

In some embodiments, the link managers 425 of each of the MCUs 420 may generate and exchange management and control messages over physical cables 422 and 424 to synchronize various copies of the configuration information for network element 220 between themselves, i.e., between the link managers 425 of the active MCU and the standby MCU. In various embodiments, the configuration information may include information specifying the resources provisioned in the network element (e.g., in the tributary units) to perform various data plane functions, the values of configurable parameters of those provisioned resources, indications of which optional or configurable features of a tributary unit are enabled or disabled, status information indicating which of the MCUs is currently designated as the active MCU, and/or software images for implementing the data plane functions performed by the tributary units, among other configuration elements. The link managers 425 of each of the MCUs 420 may generate and exchange management and control messages with the link managers 435 of the tributary units 430 to implement requested configuration transactions.

The tributary units 430 may be or include any type of component configured to perform a respective function in a data plane over which user traffic is carried in the optical transport network including, but not limited to, one or more switch units, one or more transport units and/or one or more wavelength units, any of which may be or include an optical add/drop multiplexer, for example. As described herein, at any given time, at most one of the tributary units 430 may be designated as a witness tributary unit. In addition to including circuitry for implementing its own data plane functionality as a switch unit, a transport unit (e.g., an optical transmitter, receiver, or transponder), or a wavelength unit, one of the tributary units 430 may be designated as a witness tributary unit. This designated tributary unit may include additional software or circuitry for performing the role of the witness tributary unit, as described herein. In some embodiments, more than one of the tributary units may include the additional software or circuitry required of a witness tributary unit, but only one of these tributary units may be enabled or selected to perform the role of a witness tributary unit at a time. As described in more detail herein, the link managers 425 of one or both of the MCUs 420 may generate and exchange other types of management and control messages with the link manager 435 of the tributary unit designated as the witness tributary unit to provide control plane redundancy in response to a failure of the active MCU, a failure of the standby MCU, or a loss of communication between the active MCU and the standby MCU.

As shown in FIG. 4, network management system 410 is communicatively coupled to network element 220 over management network 415, through which management and control messages may be communicated to network element 220. For example, network management system 410 may send to network element 220 initial configuration information and configuration transactions representing changes to a provisioned resource of the disaggregated network element. In various embodiments, the configuration transactions may indicate, for example, the creation or deletion of an interface or circuit, the enabling or disabling of a circuit, the setting or resetting of an operating parameter, the enabling or disabling of a functional feature, or another desired change to a provisioned resource in the network element (e.g., in the tributary units) to perform various data plane functions, the values of configurable parameters of those provisioned resources, or indications of which optional or configurable features of a tributary unit are to be enabled or disabled. As previously noted, initial configuration information, configuration transactions, and other management and control commands or requests directed to network element 220 may be received via the management network of the management and control plane of the optical transport network at a single IP address for the disaggregated network element. In some embodiments, the initial configuration information, configuration transactions, and other management and control commands or requests may be directed internally, over communication links 416 and 418, to both of the management and control units 420 regardless of which MCU 420 is designated as the active MCU for the management and control plane and which MCU 420 is designated as a standby MCU for the management and control plane.

In response to receiving a configuration transaction, the MCU 420 designated as the active MCU may send a first management and control message to the tributary unit 430 targeted by the configuration transaction to affect the change.

For example, if MCU 420-1 is designated as the active MCU, MCU 420-1 may send a management and control message to tributary unit 430-1 over physical cable 426, to tributary unit 430-2 over physical cable 432, or to tributary unit 430-n over physical cable 436. Alternatively, if MCU 420-2 is designated as the active MCU, MCU 420-2 may send a management and control message to tributary unit 430-1 over physical cable 428, to tributary unit 430-2 over physical cable 434, or to tributary unit 430-n over physical cable 438. The MCU 420 designated as the active MCU may store an indication of the configuration transaction in a primary copy of configuration information for network element 220 hosted on the active MCU. In some embodiments, the primary copy of the configuration information may be stored in a database on the active MCU and may include software images. The MCU 420 designated as the active MCU may also send a second management and control message including an indication of the configuration transaction to the standby MCU to synchronize a secondary copy of the configuration information hosted on the standby MCU with the primary copy of the configuration information. In some embodiments, the secondary copy of the configuration information may be stored in a database on the standby MCU and may include software images. In some embodiments, the active MCU may send a third management and control message including an indication of the configuration transaction to the witness tributary unit to synchronize an additional secondary copy of the configuration information, or a backup copy of the configuration information, hosted on the witness tributary unit, which might or might not be synchronized with the primary copy of the configuration information.

Note that FIGS. 2, 3 and 4 do not illustrate the data plane over which user traffic is carried in the optical transport network. Instead, only management and control traffic is shown. In at least some embodiments, the data plane may be completely separate and disjoined from the management and control plane. For example, the management and control traffic may be thought of as north-south traffic flowing vertically between a network management system and each network element and between various MCUs and tributary units with a single network element, while the data plane traffic may be thought of as east-west traffic flowing horizontally between adjacent network elements.

Unlike in a chassis-based system, in a disaggregated network element if a given MCU cannot communicate with its peer MCU, it cannot be assumed that the peer MCU has failed because the loss of communication may be due to mis-cabling or a failure of a physical cable between the MCUs rather than a failure of the peer MCU itself. For example, in at least some embodiments of the disaggregated network elements described herein, the active MCU may consult the tributary unit designated as the witness tributary unit, either periodically or in response to a loss of communication with a standby MCU, to request an indication of the health of the standby MCU and may take corrective action to provide redundancy in the management and control plane that is dependent on the health of the standby MCU. Similarly, a standby MCU may consult the tributary unit designated as the witness tributary unit, either periodically or in response to a loss of communication with the active MCU, to request an indication of the health of the active MCU and may take corrective action to provide redundancy in the management and control plane that is dependent on the health of the active MCU.

In some embodiments, to determine the health of a peer MCU, a management and control message may be sent by the witness tributary unit to the peer MCU to initiate an internal health check on the peer MCU, such as a built-in-self-test that checks the operational status of the peer MCU. The results of the internal health check may be returned to the witness tributary unit as an indication of the health of the peer MCU and may include an indication of whether the peer MCU is currently designated as the active MCU or is currently designated as a standby MCU. In some embodiments, determining the health of a peer MCU may include the witness tributary unit sending a management and control message to the peer MCU that is essentially a "ping" to determine if the communication link between the witness tributary unit is intact and the peer MCU itself is operational. A reply to this management and control message may be considered an indication of the health of the peer MCU. If the witness tributary unit receives an indication of the health of the peer MCU in the form of a reply from these or other types of health check messages, the witness tributary unit may return a management and control message to the given MCU that requested the health check indicating that the peer MCU has not failed. In this case, it is likely that the physical cable for the communication link between the given MCU and the peer MCU has somehow been disconnected or mis-cabled or that the cable itself has failed. If, on the other hand, the witness tributary unit does not receive a reply from these or other types of health check messages, the witness tributary unit may return a management and control message to the given MCU that requested the health check indicating that the peer MCU has likely failed.

As previously noted, in some embodiments, multiple tributary units (or, in some cases, all tributary units) may include an additional hardware or software module configured to perform witness tributary unit functions related to management and control plane redundancy, such as performing health checks on various MCUs with which communication has been lost. For example, in some embodiments, an additional software module on these witness tributary units may be programmed to perform such health checks in addition to implementing tributary-specific functionality in the data plane of the optical transport network. In some embodiments in which there are multiple tributary units capable of performing the health checks of a witness tributary unit, the MCU requesting a health check may only consider the response received from a selected one of the tributary units designated as an active witness tributary unit, although respective responses to heath checks performed by other tributary units may also be received. In other embodiments in which there are multiple tributary units capable of performing the health checks of a witness tributary unit, a voting mechanism may be used to determine whether the peer MCU is likely to have failed or that only the communication link between the given MCU and the peer MCU has failed. For example, in a disaggregated network element that includes five tributary units having witness tributary unit capabilities, if a majority of the five tributary units return an indication that the peer MCU has not failed, the given MCU may assume that the peer MCU is operational and may take appropriate corrective action. Other voting mechanisms may be used in other embodiments. In still other embodiments in which there are multiple tributary units capable of performing the health checks of a witness tributary unit, this feature may be enabled or disabled on each such tributary unit when it is initialized, or using configuration transactions, to select one or more witness tributary units from among those capable of performing the health checks. In yet another embodiment in which there are multiple tributary units capable of performing the health checks of a witness tributary unit, predefined witness tributary unit selection criteria may be used to automatically select one or more witness tributary units from among those capable of performing the health checks. In one example, the selection may be based on the respective tributary unit identifiers assigned to each of the candidate tributary units, with the tributary unit having the lowest tributary unit identifier being designated as the sole witness tributary unit.

In at least some embodiments, when and if a communication link between the active MCU and a standby MCU fails, management and control plane redundancy may be provided using the witness tributary unit. In other words, the disaggregated network elements described herein may provide management and control plane redundancy even when a direct communication link between the redundant MCUs is unreliable. In addition, in at least some embodiments, the tributary unit designated as the witness tributary unit may act as the host for a backup copy of the configuration information for the network element 220 in response to a failure of the standby MCU. For example, a backup copy of the configuration information may be stored in a database on the witness tributary unit and may include software images. As noted above, the mechanisms described herein for providing management and control plane redundancy in a disaggregated network element may be extended to include multiple witness tributary units, thus preventing an additional single point of failure in the disaggregated network element.

Figure 5:
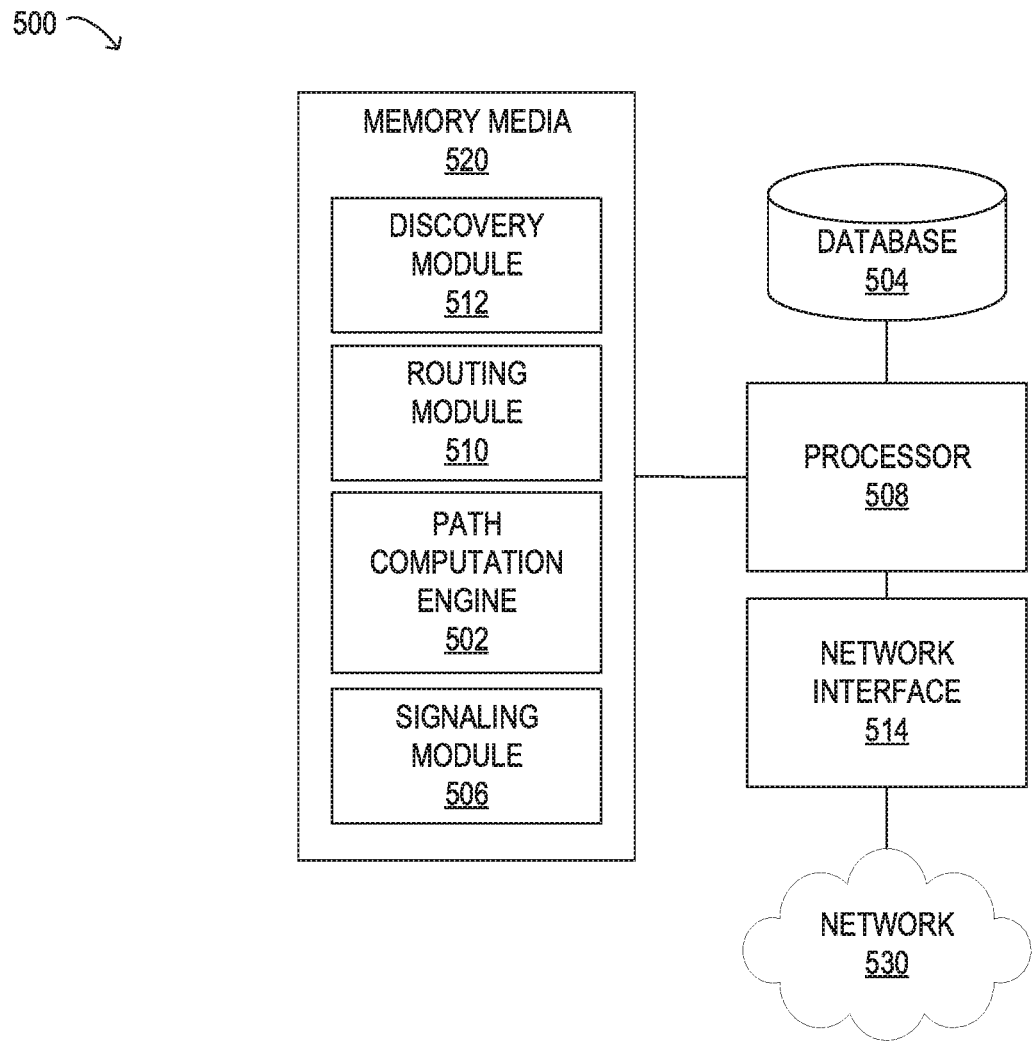
FIG. 5 is a block diagram of selected elements of an embodiment of a network management system for implementing control plane functionality in optical networks.

Referring now to FIG. 5, a block diagram of selected elements of an embodiment of network management system 500, such as network management system 410 illustrated in FIG. 4, for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 500 may work together to automatically establish services within the optical network, such as by provisioning and configuring resources of various network elements, including disaggregated network elements, to implement an initial collection of services or to implement configuration transactions representing changes to a provisioned resource of the network element. Discovery module 512 may discover local links connecting to neighbors. Routing module 510 may broadcast local link information to optical network nodes while populating database 504. When a request for service from the optical network is received, path computation engine 502 may be called to compute a network path using database 504. This network path may then be provided to signaling module 506 to establish the requested service.

As shown in FIG. 5, network management system 500 includes processor 508 and memory media 520, which may store executable instructions (i.e., executable code) that may be executable by processor 508, which has access to memory media 520. Processor 508 may execute instructions that cause network management system 500 to perform the functions and operations described herein. For the purposes of this disclosure, memory media 520 may include non-transitory computer-readable media that stores data and instructions for at least a period of time. Memory media 520 may comprise persistent and volatile media, fixed and removable media, and magnetic and semiconductor media. Memory media 520 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 520 is operable to store instructions, data, or both. Memory media 520 as shown includes sets or sequences of instructions that may represent executable computer programs, namely, path computation engine 502, signaling module 506, discovery module 512 and routing module 510.

Also shown included with network management system 500 in FIG. 5 is network interface 514, which may be a suitable system, apparatus, or device operable to serve as an interface between processor 508 and network 530. Network interface 514 may enable network management system 500 to communicate over network 530 using a suitable transmission protocol or standard. In at least some embodiments, network interface 514 may be communicatively coupled via network 530 to one or more network elements, some of which may be disaggregated network elements. In some embodiments, network interface 514 may be communicatively coupled via network 530 to a network storage resource. In some embodiments, network 530 represents at least certain portions of optical transport network 101, such as management network 415 illustrated in FIG. 4. In certain embodiments, network 530 may include at least certain portions of a public network, such as the Internet. Network 530 may be implemented using hardware, software, or various combinations thereof.

In certain embodiments, the control plane may be configured to interface with a person (i.e., a user) through network management system 500 and receive data about the desired configuration of the signal transmission path in the optical transport network. For example, network management system 500 may also include and/or may be coupled to one or more input devices or output devices to facilitate receiving data about the signal transmission path from the user and outputting results to the user. The one or more input and output devices (not shown in FIG. 5) may include, but are not limited to, a keyboard, a mouse, a touchpad, a microphone, a display, a touchscreen display, an audio speaker, or the like. Alternately or additionally, network management system 500 may be configured to receive data about the signal transmission path from a device such as another computing device or a network element (not shown in FIG. 5), for example via network 530.

As shown in FIG. 5, in some embodiments, discovery module 512 may be configured to receive data concerning an optical signal transmission path in an optical transport network and may be responsible for discovery of neighbors and links between neighbors. In other words, discovery module 512 may send discovery messages according to a discovery protocol and may receive data about the optical signal transmission path. In some embodiments, discovery module 512 may determine features, such as, but not limited to: fiber type, fiber length, number and type of components, data rate, modulation format of the data, input power of the optical signal, number of signal-carrying wavelengths (i.e., channels), channel spacing, traffic demand, and network topology, among others.

As shown in FIG. 5, routing module 510 may be responsible for propagating link connectivity information to various nodes within an optical network, such as optical transport network 101. In particular embodiments, routing module 510 may populate database 504 with resource information to support traffic engineering, which may include link bandwidth availability. Accordingly, database 504 may be populated by routing module 510 with information usable to determine a network topology of an optical transport network.

Path computation engine 502 may be configured to use the information provided by routing module 510 to database 504 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 502 may consider the interplay between the transmission degradation factors. In various embodiments, path computation engine 502 may generate values for specific transmission degradation factors. Path computation engine 502 may further store data describing the optical signal transmission path in database 504.

In FIG. 5, signaling module 506 may provide functionality associated with setting up, modifying, and tearing down end-to-end networks services in optical transport network 101. For example, when an ingress node in the optical transport network receives a service request, the control plane may employ signaling module 506 to request a network path from path computation engine 502 that may be optimized according to different criteria, such as bandwidth, cost, etc. When the desired network path is identified, signaling module 506 may then communicate with respective network elements along the network path to establish the requested network services. In various embodiments, signaling module 506 may employ a signaling protocol to propagate subsequent communications to and from various network elements along the network path to effect a configuration transaction targeting particular tributary units within those network elements.

In operation of network management system 500, path computation engine 502, or another entity or module, may provide path information associated with a given optical path, such as a distance, a number and type of optical channels to be transmitted, a fiber type, and a dispersion map. For example, signaling module 506, or another entity or module, may receive the path information and may determine the modulation format to be used for a given optical channel and whether or not to apply constellation shaping. In some embodiments, path computation engine 502, or another entity or module, may select a suitable shaping parameter pair based on characteristics of the transmission media and initiate the configuration of one or more transponders to set the entropy and the forward error correction code rate for the optical path in accordance with the shaping strength level and error correction strength level of the selected shaping parameter pair. In order to activate probabilistic constellation shaping, signaling module 506 may send a first configuration transaction to each transmitter for each of the optical channels, respectively, indicating the modulation format to which probabilistic constellation shaping should be applied, along with the selected entropy and the selected forward error correction code rate. Then, signaling module 506 may send a second configuration transaction to each receiver corresponding to each transmitter to activate probabilistic constellation shaping. Transmitters and receivers having universal programmable transponder functionality may receive the configuration transactions from signaling module 506 and may then activate or deactivate transmission of the optical channels using constellation shaping in accordance with the received configuration transactions.

In operation of network management system 500, after an optical path has been provisioned, network management system 500 may issue configuration transactions to configure and/or reconfigure transmitters 102 and receivers 112 to implement a suitable modulation format, symbol rate, entropy, FEC code rate, and amount of optical power transmitted for the optical path as determined by network management system 500 in response to changing conditions.

Figure 6:
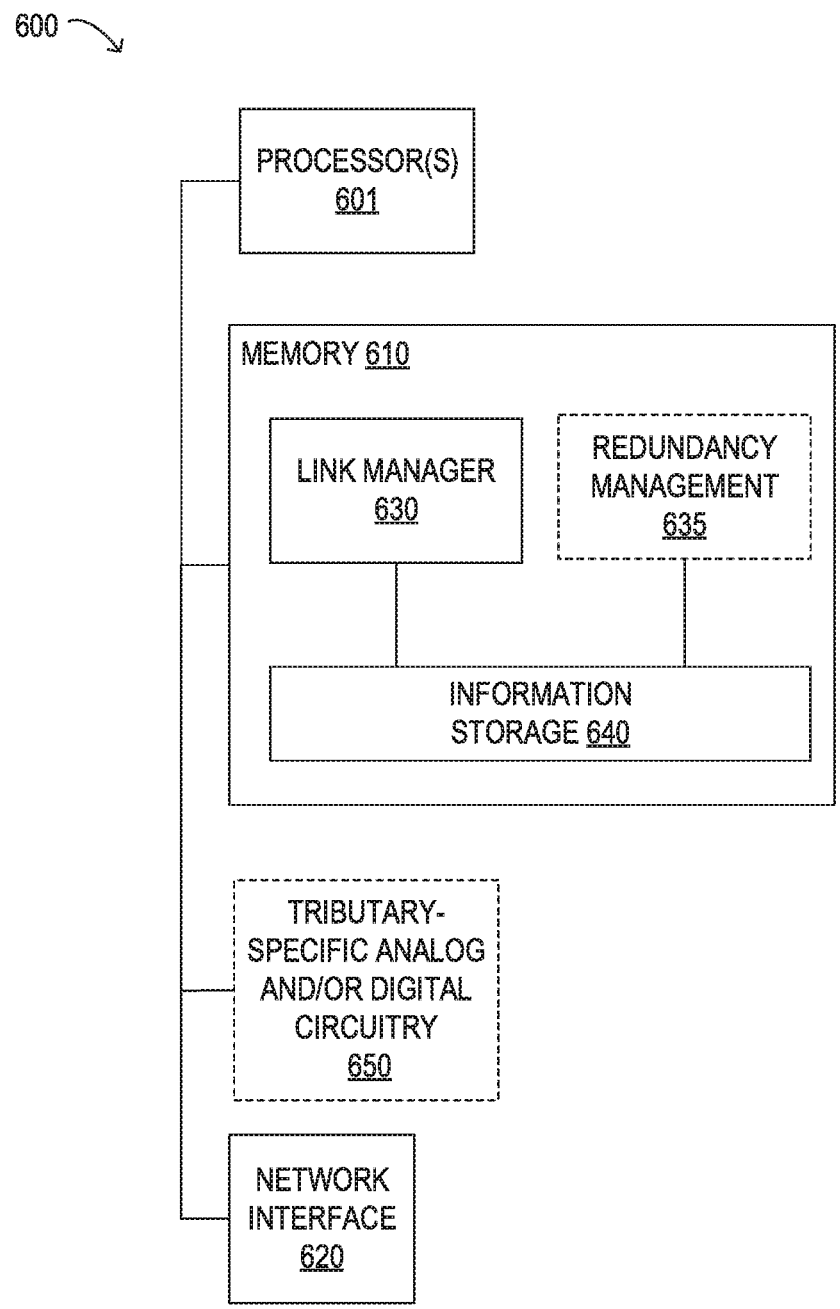
FIG. 6 is a block diagram of selected elements of an embodiment of a functional unit in a disaggregated network element.

FIG. 6 is a block diagram of selected elements of a functional unit 600 in a disaggregated network element, according to at least some embodiments. In FIG. 6, functional unit 600 is represented as a computer system including physical and logical components for implementing an MCU or a functional unit configured to perform a specific function in a data plane over which user traffic is carried in an optical transport network, such as any of a variety of tributary units including, but not limited to, those described herein. However, some of these components of a disaggregated network element may not include all of the components illustrated in FIG. 6, in some embodiments. In other embodiments, any of the functional units described herein may include more, fewer, or different components than those included in the example embodiment illustrated in FIG. 6.

As illustrated in this example, functional unit 600 may, accordingly, include one or more processors 601, a memory 610, and a network interface 620. Processor 601 may represent one or more individual processing units and may execute program instructions, interpret data, and process data stored by memory 610 or another component within functional unit 600 to implement the functionality of any of the functional units of the disaggregated network elements described herein, in different embodiments. Network interface 620 may be a suitable system, apparatus, or device operable to serve as an interface between processor 601 and a network. For example, in embodiments in which functional unit 600 represents an MCU, network interface 630 may serve as an interface between processor(s) 601 of the MCU and a management network of the management and control plane, such as management network 415 illustrated in FIG. 4. In embodiments in which functional unit 600 represents a functional unit configured to perform a specific function in a data plane over which user traffic is carried in an optical transport network, network interface 620 may enable functional unit 600 to communicate over an internal control plane network of the network element or over a network in the data plane using a suitable transmission protocol or standard. In at least some embodiments, network interface 600 may be communicatively coupled via management network 415 to a network management system, such as network management system 410 illustrated in FIG. 4 or network management system 500 illustrated in FIG. 5. In some embodiments, network interface 600 may be communicatively coupled via a network to a network storage resource (not shown in FIG. 6).

In embodiments in which functional unit 600 represents a tributary unit of a disaggregated network element, tributary-specific analog and/or digital circuitry 650 may represent circuitry, logic, and/or program instructions for implementing a specific function in a data plane over which user traffic is carried in an optical transport network.

In FIG. 6, memory 610 may be communicatively coupled to processor 601 and may comprise a system, device, or apparatus suitable to retain program instructions and data for a period of time (e.g., non-transitory computer-readable media). Memory 610 may include various types components and devices, such as random access memory (RAM), electrically erasable programmable read-only memory (EE-PROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 610 may include different numbers of physical storage devices, in various embodiments.

As shown in FIG. 6, regardless of whether functional unit 600 represents an MCU or a tributary unit of a disaggregated network element, memory 610 may include instructions 630 that are executable by processor(s) 601 to implement the functionality of a link manager, such as a link manager 425 or a link manager 435 illustrated in FIG. 4.

Figure 9:
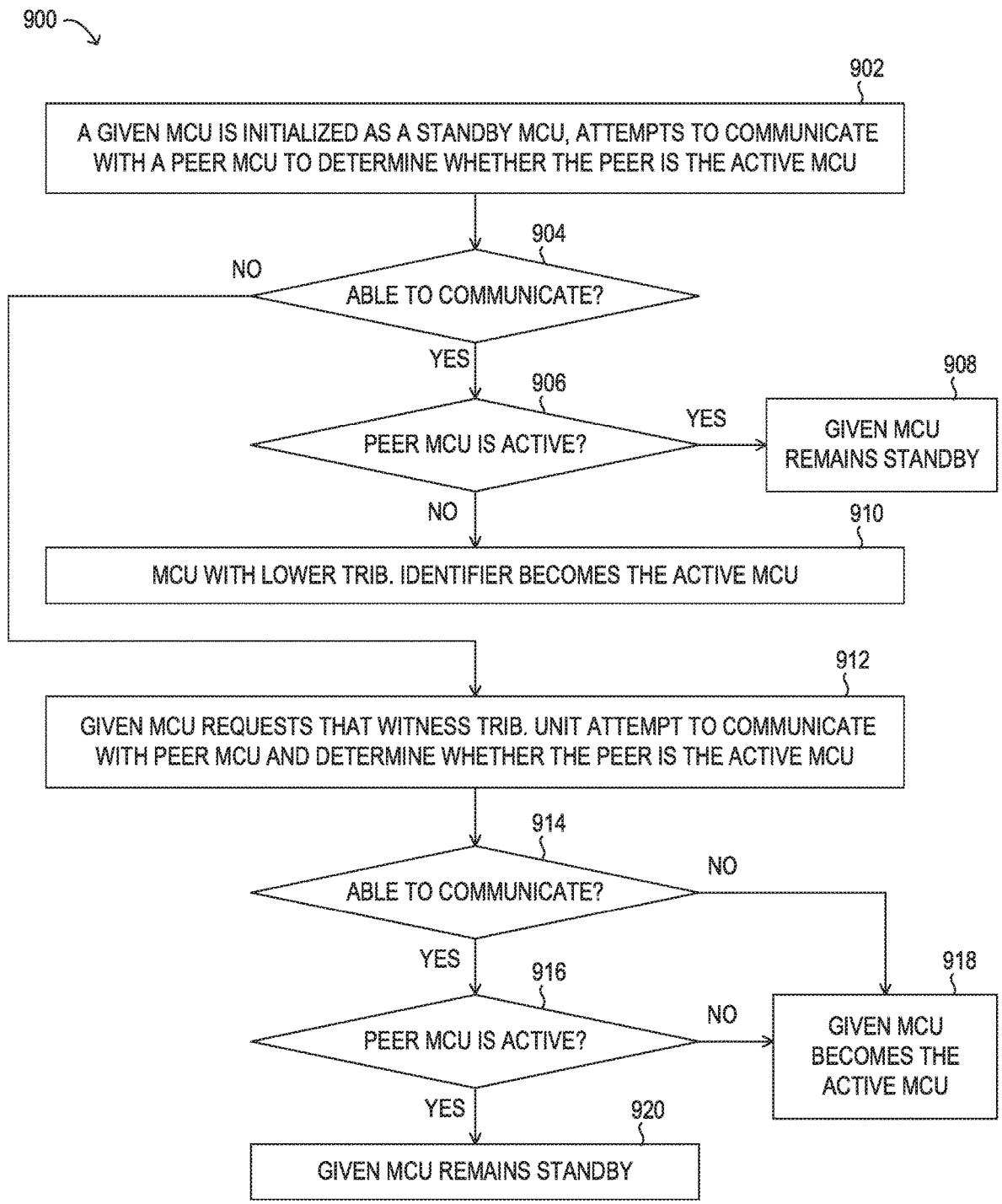
FIG. 9 is a block diagram of selected elements of an embodiment of method for electing an active management and control unit (MCU) in a disaggregated network element depicted in flowchart form.

In embodiments in which functional unit 600 represents an MCU, memory 610 may also include instructions 635 that are executable by processor(s) 601 to implement redundancy management, as described herein in reference to FIG. 9.

Memory 610 may also include information storage 640, which may store primary, secondary, or backup copies of the configuration information of the network element including, for example, software images, information usable by link manager 630 or redundancy management 635 to implement control plane redundancy in the disaggregated network element, and/or values of any default or configurable parameters used to implement the functionality described herein or any other functionality of functional unit 600.

Figure 7:
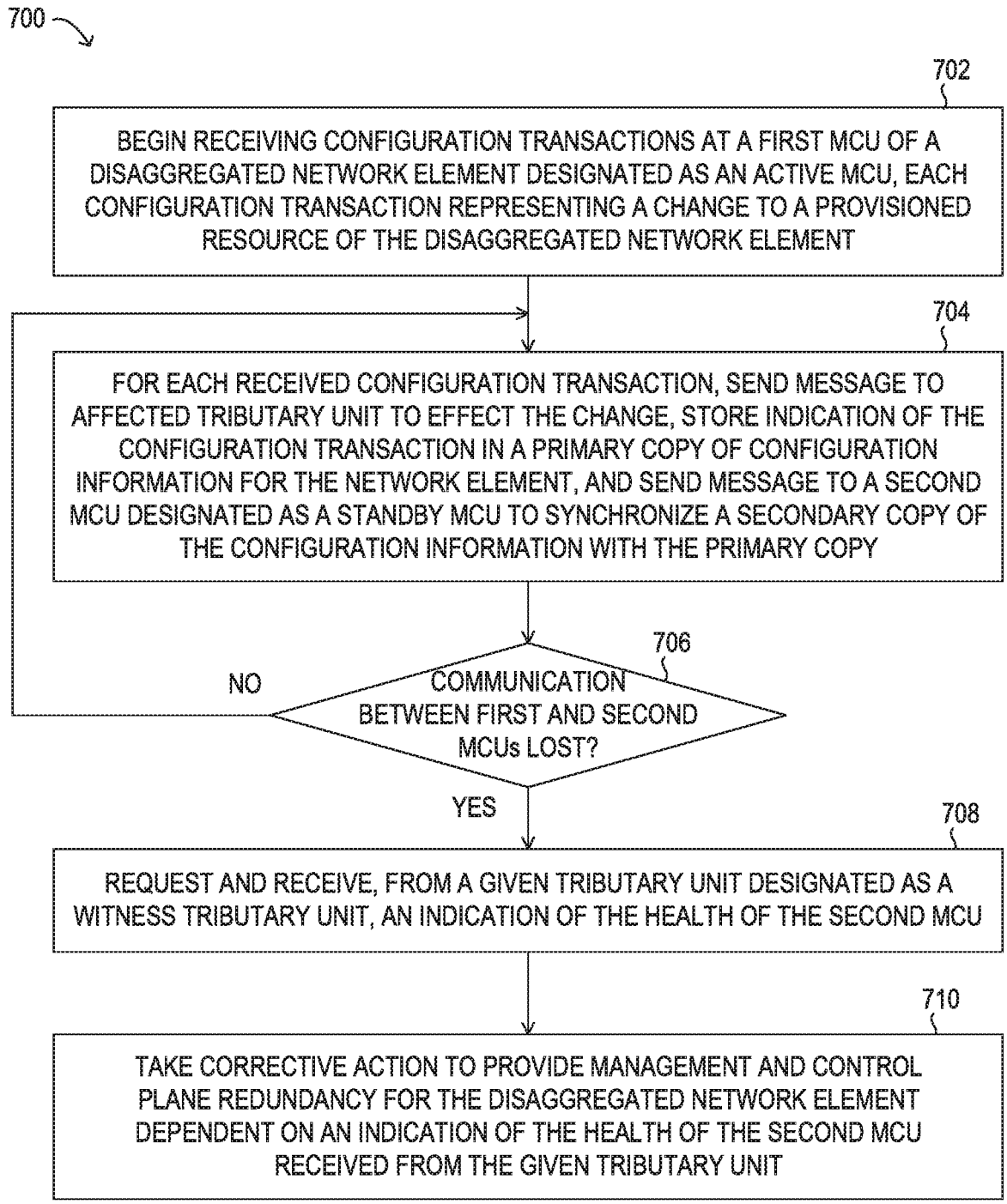
FIG. 7 is a block diagram of selected elements of an embodiment of method for implementing management and control plane redundancy in a disaggregated network element depicted in flowchart form.

FIG. 7 is a block diagram of selected elements of an embodiment of a method 700 for implementing management and control plane redundancy in a disaggregated network element depicted in flowchart form. Method 700 may be performed using a disaggregated network element of optical transport network 101. In some embodiments, certain operations of method 700 may be repeated or duplicated, either in parallel or in serially, during operation of the disaggregated network element. It is noted that certain operations described in method 700 may be optional or may be rearranged in different embodiments.

Method 700 may begin at 702 by beginning to receive configuration transactions at a first MCU of a disaggregated network element designated as an active MCU, each configuration transaction representing a desired change to a provisioned resource of the disaggregated network element. As previously noted, the configuration transactions may indicate, for example, the creation or deletion of an interface or circuit on one of the tributary units, the enabling or disabling of a circuit on one of the tributary units, the setting or resetting of an operating parameter on one of the tributary units, the enabling or disabling of a functional feature of one of the tributary units, or another desired change to a provisioned resource in the network element (e.g., in the tributary units) to perform various data plane functions, the values of configurable parameters of those provisioned resources, or indications of which optional or configurable features of a tributary unit are to be enabled or disabled.

At 704, the method includes, for each received configuration transaction, the first MCU sending a management and control message to an affected tributary unit to effect the change, storing an indication of the configuration transaction in a primary copy of configuration information for the network element hosted on the first MCU, and sending a management and control message to a second MCU designated as a standby MCU to synchronize a secondary copy of the configuration information hosted on the second MCU with the primary copy of the configuration information.

If, at 706, it is determined that communication between the first MCU and the second MCU is lost, method 700 proceeds to 708. Otherwise, the method returns to 704.

At 708, method 700 includes the first MCU requesting and receiving, from a given tributary unit designated as a witness tributary unit, an indication of the health of the second MCU. For example, the given tributary unit may be configured to perform health checks on various MCUs periodically or on demand and to return results to the first MCU. The health checks may be sent to a link manager on the second MCU from a link manager on the given tributary unit, in some embodiments.

At 710, the method includes taking corrective action to provide management and control plane redundancy for the disaggregated network element dependent on an indication of the health of the second MCU received from the given tributary unit. Examples of corrective actions taken to provide management and control plane redundancy for the disaggregated network element are described herein in reference to particular scenarios in which one or the other of the MCUs has failed or in which various communication links have failed.

In at least some embodiments, in order for the disaggregated network element to operate properly, each tributary unit may need to be connected to respective ports on all of the MCUs of the network element having the same port number. During initial deployment, a given tributary unit may be communicatively coupled to a port on a first MCU having a same port identifier as a port identifier of a port on a second MCU to which the tributary unit is also communicatively coupled. Once the given tributary unit has been successfully coupled to the two MCUs, it may be assigned a tributary unit identifier and may request and receive an internal IP address usable within the management and control plane of the disaggregated network element. For example, the internal IP address may be a private IP address used to route management and control messages as point-to-point communications from the MCUs to the tributary units within a single disaggregated network element and vice versa and may not be visible outside the network element. However, if, during initial deployment, the given tributary unit is connected to ports on a first MCU and on a second MCU that have different port numbers, this condition may be detected by one or both of the MCUs, and a mis-cable alert may be raised. In at least some embodiments, until and unless the cabling error is corrected, the given tributary unit will not be assigned a tributary unit identifier, nor will it be assigned an internal IP address. In this case, the given tributary unit will also not be able to carry any user traffic in the data plane.

In at least some embodiments, the tributary unit identifier and the internal IP address of a given tributary unit may be dependent on the port number to which the given tributary unit is connected on both MCUs. In one example, each MCU may include up to 48 ports, and each tributary unit may be connected via a physical cable to one of those ports. Each of the ports may be associated with a particular tributary unit identifier and a corresponding internal IP address. In some embodiments, the mapping between the ports, the tributary unit identifiers and the internal IP addresses may be fixed according to default values programmed into a table that is an element of the configuration information for the disaggregated network element. In such embodiments, the assignment of tributary unit identifiers and internal IP addresses may be performed automatically in response to the successful connection of various tributary units to respective MCU ports. In other embodiments, the mapping between the ports, the tributary unit identifiers and the internal IP addresses may be configurable by a user, administrator, or operator of the optical transport network. In some embodiments, if, following a successful initial deployment of a given tributary unit, a cabling error occurs, the given tributary unit may lose communication with the management and control plane, but may continue carrying user traffic in the data plane.

Figure 8:
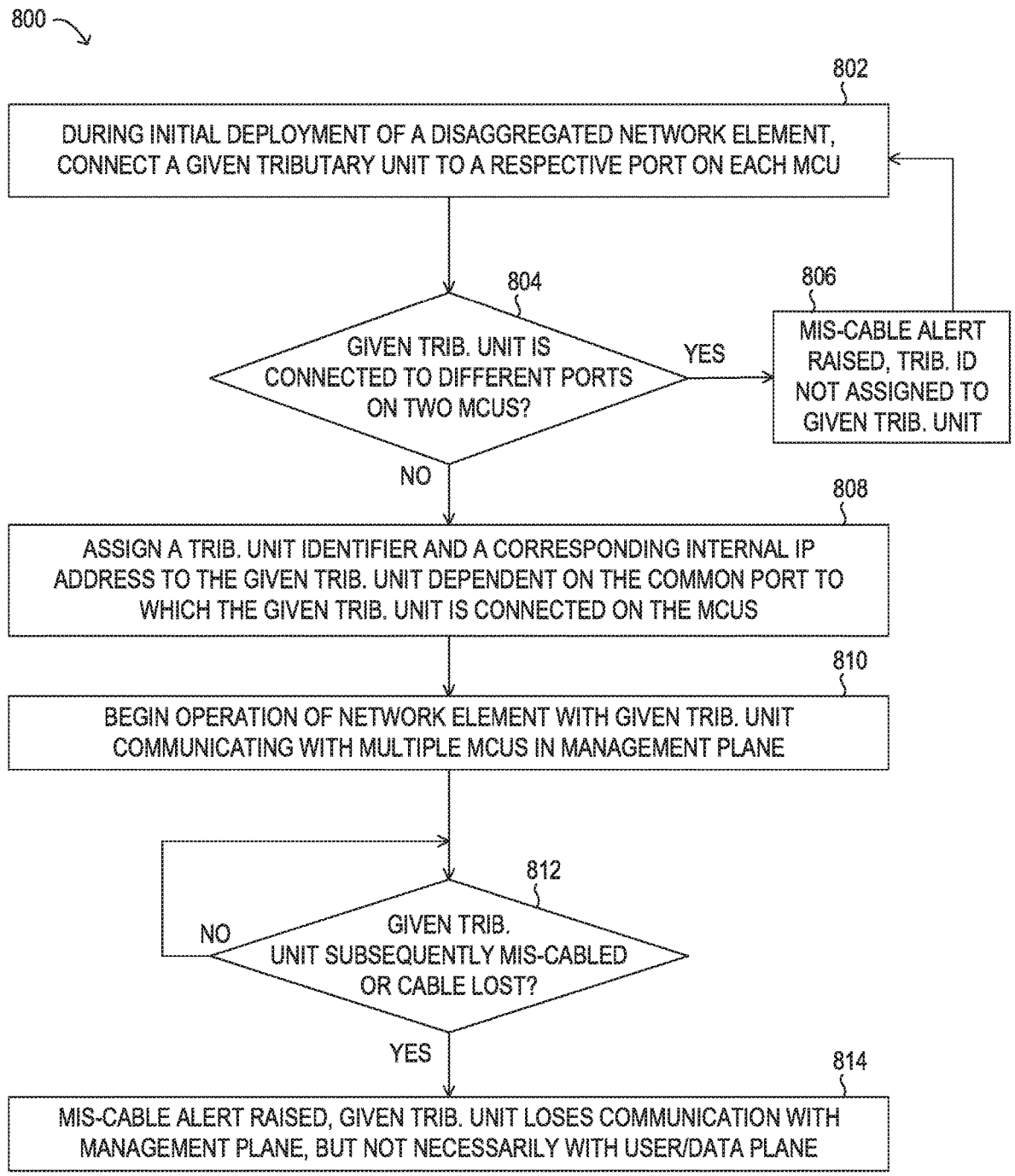
FIG. 8 is a block diagram of selected elements of an embodiment of method for detecting and responding to a cabling error in a disaggregated network element depicted in flowchart form.

FIG. 8 is a block diagram of selected elements of an embodiment of a method 800 for detecting and responding to a cabling error in a disaggregated network element depicted in flowchart form. Method 800 may be performed using a disaggregated network element of optical transport network 101. In some embodiments, certain operations of method 800 may be repeated or duplicated, either in parallel or in serially, during operation of the disaggregated network element. It is noted that certain operations described in method 800 may be optional or may be rearranged in different embodiments.

Method 800 may begin at 802 when, during an initial deployment of a disaggregated network element, a given tributary unit is connected to a respective port on each of multiple MCUs in the disaggregated network element. For example, the given tributary unit may be connected to a first port on an MCU designated as the active MCU and to a second port on an MCU designated as a standby MCU.

If, at 804, it is determined that the given tributary unit is connected to different ports on two MCUs, method 800 continues at 806. Otherwise, the method proceeds to 808. At 806, the method includes raising a mis-cable alert, and refraining from assigning a tributary unit identifier to the given tributary unit, after which the method may return to 802. In this case, the given tributary unit will not be operational until and unless the mis-cabling error is corrected.

At 808, method 800 includes assigning a tributary unit identifier and a corresponding internal IP address to the given tributary unit dependent on the common port to which the given tributary unit is connected on the two MCUs. In some embodiments, the assigned tributary unit identifier may be dependent on an identifier of the common port to which the given tributary unit is connected, such as a common port number.

At 810, the method may include beginning operation of the disaggregated network element with the given tributary unit communicating with the multiple MCUs in the management and control plane.

If and when, at 812, it is determined that the given tributary unit is subsequently mis-cabled or the connection over the physical cable to one or both of the MCUs is lost, method 800 proceeds to 814, where a mis-cable alert raised. At this point the given tributary unit loses communication with the management and control plane but does not necessarily lose communication with the data plane. In this case, the given tributary unit may continue to carry user traffic in the data plane of the optical transport network. In various embodiments, the mis-cable alert may be raised in response to a failure of the physical cable, one or both sides of a physical cable becoming disconnected and then reconnected incorrectly, or one or both sides of a physical cable becoming disconnected and not being reconnected at all.

In at least some embodiments, the MCUs of a disaggregated network element may, at their startup, implement an active MCU election process in which each MCU makes an independent decision to become the active MCU or a standby MCU. FIG. 9 is a block diagram of selected elements of an embodiment of a method 900 for electing an active MCU in a disaggregated network element depicted in flowchart form. Method 900 may be performed using a disaggregated network element of optical transport network 101. In some embodiments, certain operations of method 900 may be repeated or duplicated, either in parallel or in serially, during operation of the disaggregated network element. It is noted that certain operations described in method 900 may be optional or may be rearranged in different embodiments.

Method 900 may begin at 902 where, at startup, a given MCU is initialized as a standby MCU, and then attempts to communicate with a peer MCU to determine whether the peer MCU is currently designated as the active MCU. For example, in some embodiments, redundancy management software executing on the given MCU may, periodically or on-demand, initiate the communication of a management and control message to the peer MCU representing a request for the status of the peer MCU to determine whether the given MCU can communicate with its peer MCU and if the status of peer MCU is active.

If, at 904, the given MCU is able to communicate with the peer MCU, method 900 continues at 906. Otherwise, the method proceeds to 912. If, at 906, the peer MCU has not already been designated as the active MCU, the method continues at 910. Otherwise, if the peer MCU has already been designated as the active MCU, the method proceeds to 908 and the given MCU remains designated as a standby MCU.

At 910, since both the given MCU and the peer MCU are standby MCUs, method 900 includes one of the MCUs becoming the active MCU. In the illustrated embodiment, the MCU having been assigned the lower tributary unit identifier becomes the active MCU and the other MCU remains a standby MCU. In other embodiments, other predefined active MCU selection criteria may be used to determine which of the MCUs should promote itself from being designated as a standby MCU to being designated as the active MCU.

At 912, method 900 includes the given MCU requesting that a tributary unit designated as the witness tributary unit attempt to communicate with peer MCU and determine whether the peer is the active MCU.

If, at 914, the witness tributary unit is able to communicate with the peer MCU, method 900 continues at 916. Otherwise, the method proceeds to 918, where the given MCU becomes the active MCU.

If, at 916, it is determined that the peer MCU is active, method 900 continues at 920, where the given MCU remains a standby MCU. Otherwise, the method proceeds to 918, where the given MCU becomes the active MCU.

In at least some embodiments, the disaggregated network elements described herein may implement a distributed protection switching approach in which each individual MCU makes a decision about whether it should be designated as the active MCU or as a standby MCU independently, i.e., without relying on any type of handshaking protocol, negotiation with or confirmation from any other ones of the MCUs in the disaggregated network element, while ensuring that no two MCUs are designated as the active MCU at the same time Using this approach, in case of a failure of the currently active MCU, a standby MCU may take over as the newly active MCU to manage the network element without causing any disruption to user traffic in the data plane.

Figure 10:
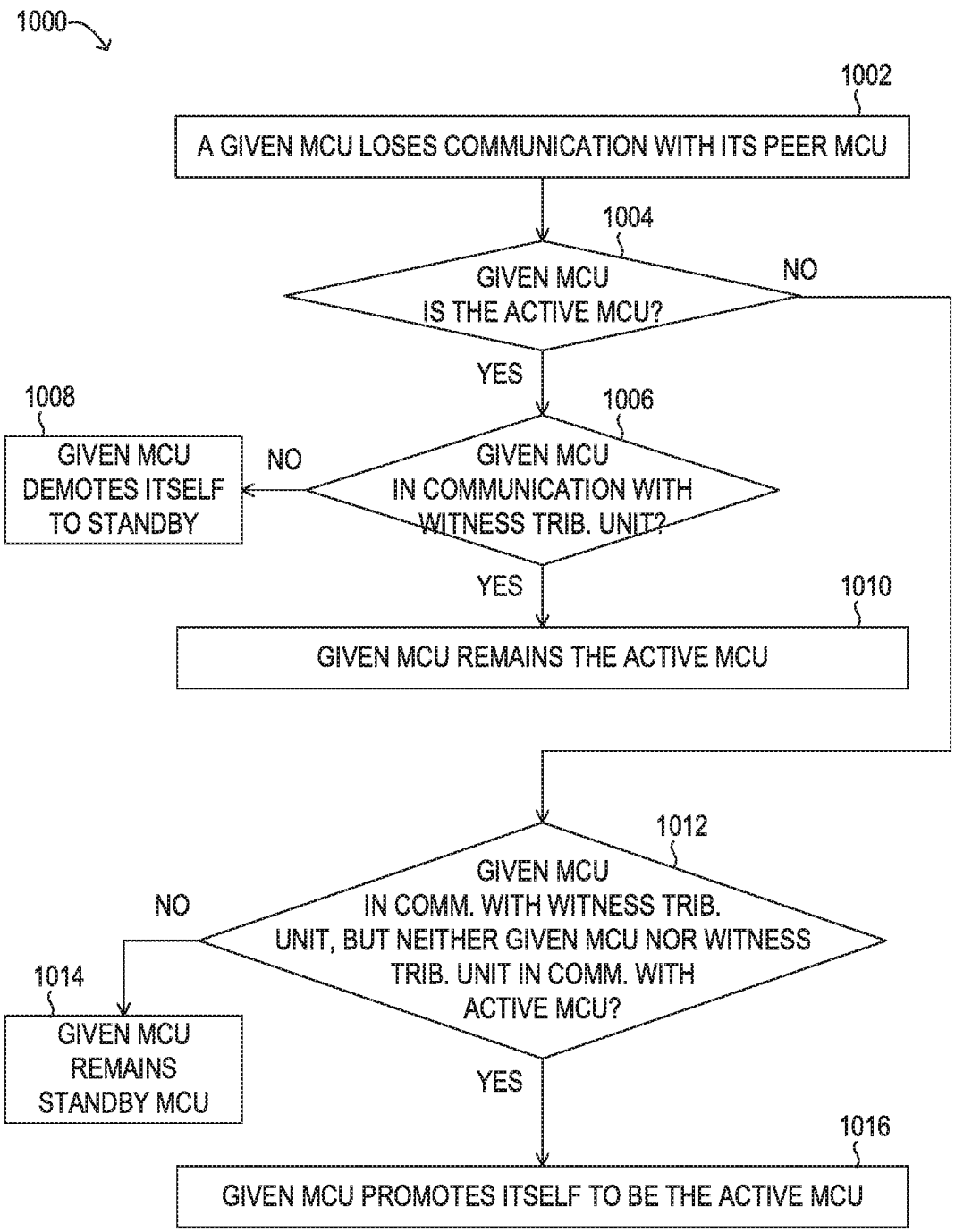
FIG. 10 is a block diagram of selected elements of an embodiment of method for distributed failover protection switching in a disaggregated network element depicted in flowchart form.

FIG. 10 is a block diagram of selected elements of an embodiment of a method 1000 for distributed failover protection switching in a disaggregated network element depicted in flowchart form. Method 1000 may be performed using a disaggregated network element of optical transport network 101. In some embodiments, certain operations of method 1000 may be repeated or duplicated, either in parallel or in serially, during operation of the disaggregated network element. It is noted that certain operations described in method 1000 may be optional or may be rearranged in different embodiments.

Method 1000 may begin at 1002 when a given MCU loses communication with its peer MCU. The loss of communication may be due to a failure of the peer MCU, a failure of a physical cable between the given MCU and the peer MCU, a disconnection of a physical able, or a mis-cabling error, in different embodiments.

If, at 1004, the given MCU is currently designated as the active MCU, method 1000 continues to 1006. Otherwise, the given MCU is currently designated as a standby MCU and the method proceeds to 1012.

If, at 1006, the given MCU is in communication with a tributary unit designated as a witness tributary unit, method 1000 proceeds to 1010. Otherwise, the method continues at 1008, where the given MCU demotes itself from a designation as the active MCU to a designation as a standby MCU. At 1010, the given MCU remains designated as the active MCU.

If, at 1012, the given MCU is in communication with a tributary unit designated as a witness tributary unit, but neither given MCU nor the witness tributary unit is in communication with currently designated active MCU, method 1000 proceeds to 1016. Otherwise, the method continues at 1014, wherein the given MCU remains designated as a standby MCU. At 1016, the given MCU promotes itself from a designation as a standby MCU to a designation as the active MCU.

In at least some embodiments, method 1000 may repeat continuously or periodically to detect a loss of communication between two MCUs and to take corrective action to provide redundancy in the control plane of the disaggregated network element following the loss of communication (not shown).

In at least some embodiments, under normal operating conditions in a disaggregated network element, the MCU designated as the active MCU may host the primary copy of the configuration information for the network element and an MCU designated as a standby MCU may host a secondary copy of the configuration information. As each configuration transaction is received and implemented, an indication of the configuration transaction is added to the configuration information and the configuration information is synchronized between the primary and secondary copies of the configuration information. In some embodiments, if one of the MCUs fails or a communication link between two MCUs fails, a secondary copy of the configuration information is moved to a tributary unit designated as a witness tributary unit as a backup copy. Subsequently, if a user provisions a new configuration, the configuration information in the primary and backup copies are synchronized. During operation, each MCU and the witness tributary unit may maintain a monotonically increasing transaction identifier indicating the latest transaction added to the copy of the configuration information hosted locally. These transaction identifiers may be used to ensure that the MCU designated as the active MCU never operates with stale resource data or a stale software image and that users do not lose any of their provisioning in the case of an MCU switchover.

Figure 11:
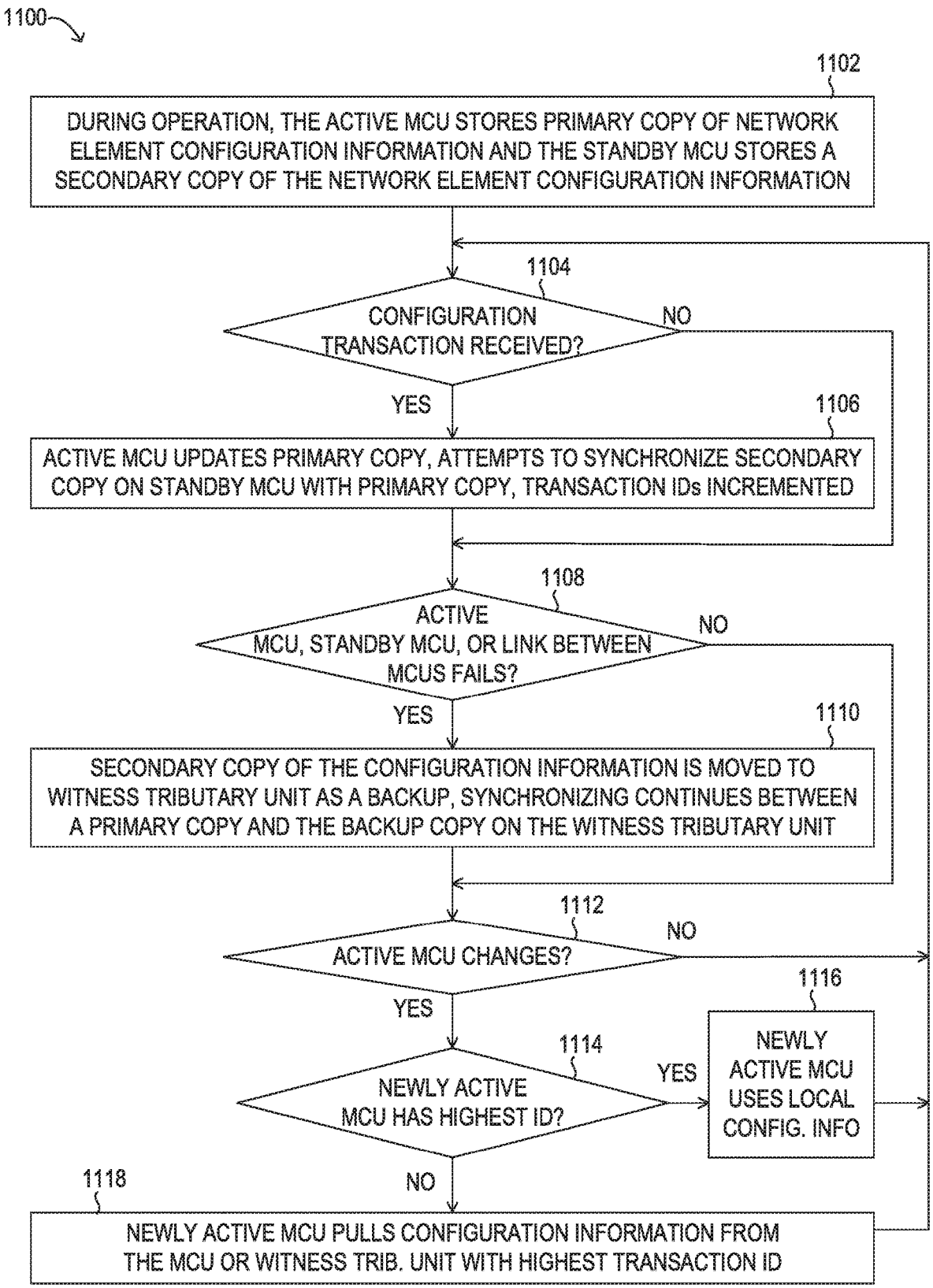
FIG. 11 is a block diagram of selected elements of an embodiment of method for synchronizing configuration data in a disaggregated network element depicted in flowchart form.

FIG. 11 is a block diagram of selected elements of an embodiment of a method 1100 for synchronizing configuration data in a disaggregated network element depicted in flowchart form. Method 1100 may be performed using a disaggregated network element of optical transport network 101. In some embodiments, certain operations of method 1100 may be repeated or duplicated, either in parallel or in serially, during operation of the disaggregated network element. It is noted that certain operations described in method 1100 may be optional or may be rearranged in different embodiments.

Method 1100 may begin at 1102 when, during operation of a disaggregated network element, the MCU currently designated as the active MCU stores a primary copy of network element configuration information locally and the MCU currently designated as the standby MCU stores a secondary copy of the network element configuration information locally.

If and when, at 1104, a configuration transaction is received, method 1100 continues at 1106. Otherwise, the method proceeds to 1108. At 1106, the active MCU updates the primary copy of the configuration information to reflect the configuration transaction and attempts to synchronize the secondary copy of the configuration information stored on the standby MCU with the primary copy. The active MCU and the standby MCU may increment respective locally-stored transaction identifiers in response to receiving the configuration transaction.

If, at 1108, the active MCU, the standby MCU, or a communication link between the active and standby MCUs fails, for any reason, method 1100 continues at 1110. Otherwise, the method proceeds to 1112.

At 1110, the method includes one of the MCUs moving a backup copy of the configuration information to a tributary unit currently designated as a witness tributary unit, after which synchronizing between the primary copy stored on the MCU and the backup copy stored on the witness tributary unit continues as additional configuration transactions are received. If the loss of communication was caused by a failure of the active MCU, the standby MCU may promote itself from a designation as a standby MCU to a designation as the active MCU, as described herein. As previously noted, in other embodiments, the tributary unit currently designated as a witness tributary unit may host a secondary or backup copy of the configuration information, may receive indications of all configuration transactions directed to the network element, and may increment a locally-stored transaction identifier in response to receipt of each configuration transaction irrespective of whether or not one of the MCUs or a communication link between the MCUs has failed.

If, at 1112, the active MCU changes, method 1100 continues to 1114. Otherwise, the method returns to 1104. If, at 1114, the newly active MCU has the highest transaction identifier among the operational MCUs and the witness tributary unit, method 1100 continues at 1116, where the newly active MCU proceeds using the configuration information stored locally on the newly active MCU. Otherwise, the method proceeds to 1118, where the newly active MCU pulls configuration information from the MCU or witness tributary unit having highest transaction identifier. In either case, method 1100 returns to 1104 to continue receiving and processing configuration transactions.

In some embodiments, under normal operating conditions, whenever a user provisions a new configuration through a configuration transaction, the updated configuration information is stored in the primary copy of the configuration information and then propagated to all secondary or backup copies, as well. However, if, for some reason, one of the secondary or backup copies is not accessible at that time, e.g., if the witness tributary unit or the standby MCU is temporarily offline or rebooting, then the updated configuration information may not be propagated to all of the secondary or backup copies right away. In this example, once the witness tributary unit or the standby MCU is brought back online or finishes rebooting, it may be able to determine, based on the transaction identifiers currently maintained by the active MCU, the standby MCU and/or the witness tributary unit, whether it has missed any configuration transactions. If so, it may contact the active MCU to request an up-to-date copy of the current configuration information.

In another example, if the standby MCU of a disaggregated network element is not available for a significant amount of time (e.g., one day) during which a user has done lot of new provisioning, the transaction identifier maintained by the active MCU and by the witness tributary unit may have increased from a value of 100 (prior to the standby MCU failing or being taken offline) to a value of 150. When the standby MCU is brought back online, it attempts to synchronize its copy of the configuration information with the primary copy hosted on the active MCU. In this example, before the synchronization is complete, the active MCU may fail or be taken offline. At that point, the copy of the configuration information hosted on the standby MCU may still only reflect up to transaction identifier 100, which is far behind the other copies. In this case, the standby MCU may communicate with the witness tributary unit to determine the last transaction identifier reflected in the copy of the configuration information hosted on the witness tributary unit, which is 150. The standby MCU, which becomes the newly active MCU in response to the loss of the active MCU, will thus recognize that it needs to synchronize its copy of the configuration information with that of the witness tributary unit before it can push any new configuration transactions to any of the tributary units to implement the indicated changes.

In at least some embodiments, the methods and systems described herein may be used to provide management and control plane redundancy in a disaggregated network element. As described herein, the disaggregated network element may implement a reliable virtual backplane, allowing the disaggregated network element to behave, from an external view, as if it were a chassis-based network element. The virtual backplane may facilitate the exchange of information between redundant MCUs so that they can each make determinations of their status as the active MCU or as a standby MCU. The disclosed approach provides management and control plane redundancy even if a communication link between the redundant MCUs is unreliable or become mis-cabled.

In at least some embodiments, the methods and systems described herein may allow an optical transport network user to enjoy the advantages of a disaggregated network element while still maintaining the protection switching behavior of a chassis-based network element. For example, in at least some embodiments, capital expenditures may by reduced in a disaggregated network element, as compared to a traditional chassis-based network element, due to space, power and form-factor optimization of the MCUs and tributary units in the disaggregated network element. However, availability and reliability may be maintained at the same level as in a chassis-based system. The disaggregated network elements described herein may be able to differentiate an active MCU failure from a failure of a communication link to the active MCU, allowing them to ensure that multiple MCUs do not become active simultaneously. Similarly, a distributed protection switching approach in which each MCU makes an independent decision to become active or standby may ensure that not more than one MCU becomes active at any point in time. The methods and systems described herein may support the use of a single IP address for each disaggregated network element with which a network management system accesses the network element irrespective of which MCU in the network element is designated as the active MCU. The methods and systems described herein may also ensure that the active MCU always has access to the latest configuration data and software images for the disaggregated network element.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A disaggregated network element, comprising:
a first management and control unit (MCU) designated as an active MCU for a management and control plane of an optical transport network and configured to host a primary copy of configuration information for the disaggregated network element;
a second MCU communicatively coupled to the first MCU over one or more physical cables, the second MCU designated as a standby MCU for the management and control plane of the optical transport network and configured to host a secondary copy of the configuration information for the disaggregated network element;
a plurality of tributary units, each of which is configured to perform a respective function in a data plane over which user traffic is carried in the optical transport network and each of which is communicatively coupled to the first MCU and the second MCU over respective physical cables, wherein a given one of the plurality of tributary units is designated as a witness tributary unit;
wherein the first MCU is configured to:
receive configuration transactions via a management network of the management and control plane of the optical transport network, each configuration transaction representing a change to a provisioned resource of the disaggregated network element;
for each received configuration transaction:
send a first management and control message to a tributary unit targeted by the configuration transaction to effect the change;
store an indication of the configuration transaction in the primary copy of configuration information; and
send a second management and control message including an indication of the configuration transaction to the second MCU to synchronize the secondary copy of the configuration information with the primary copy of the configuration information; and
responsive to detecting a loss of communication between the first MCU and the second MCU:
request, from the given tributary unit designated as the witness tributary unit, an indication of health of the second MCU; and
take corrective action to provide management and control plane redundancy in the disaggregated network element dependent on an indication of the health of the second MCU received from the given tributary unit.

2. The disaggregated network element of claim 1, wherein configuration transactions directed to the disaggregated network element are received via the management network of the management and control plane of the optical transport network at a single Internet Protocol (IP) address for the disaggregated network element irrespective of whether the first MCU or the second MCU is designated as the active MCU for the management and control plane.

3. The disaggregated network element of claim 1, wherein each of the plurality of tributary units is a standalone component of the disaggregated network element comprising a respective housing and a respective power supply.

4. The disaggregated network element of claim 1, wherein:
the first MCU comprises a link manager configured to exchange management and control messages with the second MCU;
the second MCU comprises a link manager configured to exchange management and control messages with the first MCU; and
each of the plurality of tributary units comprises a respective link manager configured to exchange management messages with the respective link managers of the first MCU and the second MCU.

5. The disaggregated network element of claim 1, wherein, for each of the plurality of tributary units, the tributary unit is communicatively coupled to a port on the first MCU having a same port identifier as a port identifier of a port on the second MCU to which the tributary unit is communicatively coupled.

6. The disaggregated network element of claim 1, wherein, responsive to detecting a loss of communication between the first MCU and the second MCU and a loss of communication between the first MCU and the given tributary unit designated as the witness tributary unit, the first MCU is configured to demote itself from a designation as the active MCU for the management and control plane to a designation as a standby MCU for the management and control plane.

7. The disaggregated network element of claim 1, wherein, to take corrective action responsive to receiving an indication from the given tributary unit designated as the witness tributary unit of a failure of the second MCU, the first MCU is configured to:
provide a backup copy of the configuration information for the disaggregated network element to the given tributary unit; and
subsequent to providing the backup copy to the given tributary unit:
receive additional configuration transactions via the management network, each additional configuration transaction representing a change to a provisioned resource of the disaggregated network element; and
for each additional configuration transaction received subsequent to providing the backup copy to the given tributary unit:
send a first management and control message to a tributary unit targeted by the configuration transaction to effect the change;
store an indication of the configuration transaction in the primary copy of configuration information; and
send a second management and control message including an indication of the configuration transaction to the given tributary unit to synchronize the backup copy of the configuration information with the primary copy of the configuration information.

8. The disaggregated network element of claim 1, further comprising a third MCU communicatively coupled to the first MCU and the second MCU over respective physical cables, the third MCU designated as a standby MCU for the management and control plane of the optical transport network and configured to host a tertiary copy of the configuration information for the disaggregated network element;

wherein, for each received configuration transaction, the first MCU is further configured to send a third management and control message including an indication of the configuration transaction to the third MCU to synchronize the tertiary copy of the configuration information with the primary copy of the configuration information.

9. The disaggregated network element of claim 1, wherein:

a tributary unit other than the given tributary unit is designated as an additional witness tributary unit; and selection of the given tributary unit rather than the other tributary unit as the tributary unit from which an indication of health of the second MCU is requested by the first MCU is configurable.

10. A method for providing management and control plane redundancy in a disaggregated network element, comprising:

beginning to receive, at a first management and control unit (MCU) of the disaggregated network element designated as an active MCU for a management and control plane of an optical transport network, configuration transactions via a management network of the management and control plane of the optical transport network, each configuration transaction representing a change to a provisioned resource of the disaggregated network element;

for each received configuration transaction:

sending, by the first MCU, a first management message to a tributary unit of the disaggregated network element targeted by the configuration transaction to effect the change, the tributary unit targeted by the configuration transaction being one of a plurality of tributary units, each of which is configured to perform a respective function in a data plane over which user traffic is carried in the optical transport network and each of which is communicatively coupled, over respective physical cables, to the first MCU and to a second MCU communicatively coupled to the first MCU over one or more physical cables, the second MCU designated as a standby MCU for the management and control plane of the optical transport network;

storing, by the first MCU, an indication of the configuration transaction in a primary copy of configuration information for the disaggregated network element hosted by the first MCU; and sending, by the first MCU, a second management message including an indication of the configuration transaction to the second MCU to synchronize a secondary copy of the configuration information hosted by the second MCU with the primary copy of the configuration information;

detecting a loss of communication between the first MCU and the second MCU; and responsive to detecting the loss of communication between the first MCU and the second MCU:

requesting, from a given one of the plurality of tributary units designated as a witness tributary unit, an indication of health of the second MCU; and taking corrective action to provide management and control plane redundancy for the disaggregated network element dependent on an indication of the health of the second MCU received from the given tributary unit.

11. The method of claim 10, further comprising, prior to beginning to receive configuration transactions at the first MCU:

the first MCU assuming an initial designation as a standby MCU for the management and control plane upon startup;

the first MCU determining that the disaggregated network element does not already include an MCU designated as the active MCU for the management and control plane;

the first MCU determining that the second MCU is designated as a standby MCU; and dependent on predefined active MCU selection criteria, the first MCU promoting itself from a designation as a standby MCU to a designation as the active MCU for the management and control plane.

12. The method of claim 10, further comprising:

during initial deployment of a first one of the plurality of tributary units, communicatively coupling the first tributary unit to a port on the first MCU having a same port identifier as a port identifier of a port on the second MCU to which the tributary unit is communicatively coupled;

subsequent to the initial deployment of the first tributary unit, determining that the first tributary unit is no longer communicatively coupled to respective ports on the first MCU and on the second MCU having the same port number; and raising a mis-cable alert indicating that the first tributary unit is no longer able to communicate with the first MCU and the second MCU in the management and control plane.

13. The method of claim 10, further comprising:

the first MCU detecting that it has lost communication with the second MCU and with the given tributary unit designated as the witness tributary unit; and the first MCU demoting itself from a designation as the active MCU for the management and control plane to a designation as a standby MCU for the management and control plane.

14. The method of claim 10, further comprising:

the second MCU detecting that it has lost communication with the first MCU, that it remains in communication with the given tributary unit designated as the witness tributary unit, and that the given tributary unit is no longer in communication with the first MCU; and the second MCU promoting itself from a designation as a standby MCU for the management and control plane to a designation as the active MCU for the management and control plane.

15. The method of claim 10, wherein:

responsive to receiving an indication from the given tributary unit designated as the witness tributary unit of a failure of the second MCU, taking corrective action to provide management and control plane redundancy for the disaggregated network element comprises providing, by the first MCU a backup copy of the configuration information for the disaggregated network element to the given tributary unit; and the method further comprises, subsequent to providing the backup copy to the given tributary unit:

receiving, by the first MCU, additional configuration transactions via the management network, each additional configuration transaction representing a change to a provisioned resource of the disaggregated network element; and for each additional configuration transaction received subsequent to providing the backup copy to the given tributary unit:

sending, by the first MCU, a first management and control message to a tributary unit targeted by the configuration transaction to effect the change;

storing, by the first MCU, an indication of the configuration transaction in the primary copy of configuration information; and sending, by the first MCU, a second management and control message including an indication of the configuration transaction to the given tributary unit to synchronize the backup copy of the configuration information with the primary copy of the configuration information.

16. The method of claim 15, further comprising:
for each received configuration transaction:
incrementing, by the first MCU, a first transaction identifier maintained by the first MCU; and
incrementing, by the second MCU, a second transaction identifier maintained by the second MCU;
for each additional received configuration transaction:
incrementing, by the first MCU, the first transaction identifier maintained by the first MCU; and
incrementing, by the given tributary unit designated as the witness tributary unit, a third transaction identifier maintained by the given tributary unit.

17. The method of claim 16, further comprising:
determining that an MCU other than the first MCU is a newly active MCU for the management and control plane;
determining that a transaction identifier maintained by the newly active MCU has a lower value than a transaction identifier maintained by another MCU in the disaggregated network element or by the given tributary unit designated as the witness tributary unit; and
obtaining, by the newly active MCU, configuration information stored by the other MCU or the given tributary unit having a highest transaction identifier value.

18. An optical transport network, comprising a plurality of disaggregated network elements communicatively coupled to a management network, each comprising:

a first management and control unit (MCU) designated as an active MCU for a management and control plane of an optical transport network and configured to host a primary copy of configuration information for the disaggregated network element;

a second MCU communicatively coupled to the first MCU over one or more physical cables, the second MCU designated as a standby MCU for the management and control plane of the optical transport network and configured to host a secondary copy of the configuration information for the disaggregated network element;

a plurality of tributary units, each of which is configured to perform a respective function in a data plane over which user traffic is carried in the optical transport network and each of which is communicatively coupled to the first MCU and the second MCU over respective physical cables, wherein a given one of the plurality of tributary units is designated as a witness tributary unit;

wherein the first MCU is configured to:

receive configuration transactions via a management network of the management and control plane of the optical transport network, each configuration transaction representing a change to a provisioned resource of the disaggregated network element;

for each received configuration transaction:

send a first management and control message to a tributary unit targeted by the configuration transaction to effect the change;

store an indication of the configuration transaction in the primary copy of configuration information; and send a second management and control message including an indication of the configuration transaction to the second MCU to synchronize the secondary copy of the configuration information with the primary copy of the configuration information; and responsive to detecting a loss of communication between the first MCU and the second MCU:

request, from the given tributary unit designated as the witness tributary unit, an indication of health of the second MCU; and take corrective action to provide management and control plane redundancy in the disaggregated network element dependent on an indication of the health of the second MCU received from the given tributary unit.

19. The optical transport network of claim 18, wherein configuration transactions directed to each of the disaggregated network elements are received via the management network of the management and control plane of the optical transport network at a respective single Internet Protocol (IP) address for the disaggregated network element irrespective of whether the first MCU or the second MCU is designated as the active MCU for the management and control plane.

20. The optical transport network of claim 18, wherein, for at least one of the plurality of disaggregated network elements, to take corrective action responsive to receiving an indication from the given tributary unit designated as the witness tributary unit of a failure of the second MCU, the first MCU is configured to:

provide a backup copy of the configuration information for the disaggregated network element to the given tributary unit; and subsequent to providing the backup copy to the given tributary unit:

receive additional configuration transactions via the management network, each additional configuration transaction representing a change to a provisioned resource of the disaggregated network element; and for each additional configuration transaction received subsequent to providing the backup copy to the given tributary unit:

send a first management and control message to a tributary unit targeted by the configuration transaction to effect the change;

store an indication of the configuration transaction in the primary copy of configuration information; and send a second management and control message including an indication of the configuration transaction to the given tributary unit to synchronize the backup copy of the configuration information with the primary copy of the configuration information.

* * * * *